(12) United States Patent
Pisanu et al.

(10) Patent No.: US 11,845,145 B2
(45) Date of Patent: Dec. 19, 2023

(54) LASER END EFFECTOR, AND CORRESPONDING LASER MACHINE TOOL AND MANUFACTURING METHOD

(71) Applicant: Prima Industrie S.p.A., Collegno (IT)

(72) Inventors: Enrico Pisanu, Collegno (IT); Silvio Parise, Collegno (IT)

(73) Assignee: Prima Industrie S.p.A., Collegno (IT)

( * ) Notice: Subject to any disclaimer, the term of this patent is extended or adjusted under 35 U.S.C. 154(b) by 25 days.

(21) Appl. No.: 17/234,375

(22) Filed: Apr. 19, 2021

(65) Prior Publication Data

US 2021/0362276 A1 Nov. 25, 2021

(30) Foreign Application Priority Data

Apr. 20, 2020 (IT) .................. 102020000008386

(51) Int. Cl.
| | |
|---|---|
| *B23K 26/70* | (2014.01) |
| *B33Y 80/00* | (2015.01) |
| *B23K 26/146* | (2014.01) |
| *B23K 26/14* | (2014.01) |
| *B33Y 10/00* | (2015.01) |
| *B23K 26/342* | (2014.01) |
| *B22F 10/28* | (2021.01) |

(52) U.S. Cl.
CPC ............ *B23K 26/703* (2015.10); *B22F 10/28* (2021.01); *B23K 26/146* (2015.10); *B23K 26/1476* (2013.01); *B23K 26/342* (2015.10); *B33Y 10/00* (2014.12); *B33Y 80/00* (2014.12)

(58) Field of Classification Search
CPC .. B23K 26/703; B23K 26/342; B23K 26/702; B23K 26/1462; B23K 26/1464; B23K 26/1476; B33Y 10/00; B33Y 80/00; B22F 10/28

USPC ................................................. 219/121.84
See application file for complete search history.

(56) References Cited

U.S. PATENT DOCUMENTS

| | | | | |
|---|---|---|---|---|
| 6,316,744 | B1 * | 11/2001 | Nowotny | B23K 26/144 |
| | | | | 219/121.84 |
| 8,445,815 | B2 * | 5/2013 | Lambert | B23K 26/702 |
| | | | | 219/121.61 |
| 10,213,872 | B2 * | 2/2019 | Peters | B23K 26/144 |
| 2006/0113392 | A1 * | 6/2006 | Otsuka | B23K 26/08 |
| | | | | 235/462.36 |
| 2015/0048071 | A1 * | 2/2015 | Shioji | B23K 26/1476 |
| | | | | 219/121.84 |

(Continued)

FOREIGN PATENT DOCUMENTS

| | | | | |
|---|---|---|---|---|
| WO | WO-2013163398 | A1 * | 10/2013 | B22F 3/008 |
| WO | WO-2019057244 | A1 * | 3/2019 | B23K 10/00 |

OTHER PUBLICATIONS

Machine English Translation of WO-2019057244-A1 (Year: 2019).*

*Primary Examiner* — Sang Y Paik
*Assistant Examiner* — Erwin J Wunderlich
(74) *Attorney, Agent, or Firm* — Nixon & Vanderhye P.C.

(57) ABSTRACT

An end effector for a laser machine tool is configured to direct a laser beam onto a working surface along an optical axis of propagation of the laser beam. The end effector includes a supporting body having a duct with an axis parallel to at least one portion of the optical axis of propagation of the laser beam, and a further duct configured to be coupled to the supporting body and to provide an outlet for the laser beam.

17 Claims, 14 Drawing Sheets

(56) References Cited

U.S. PATENT DOCUMENTS

2015/0360287 A1* 12/2015 Zink .................. B22F 3/24
                                                    419/53
2016/0288267 A1* 10/2016 Gesuita ............. B23K 26/0648
2018/0318929 A1* 11/2018 Matthews ............ B33Y 30/00

* cited by examiner

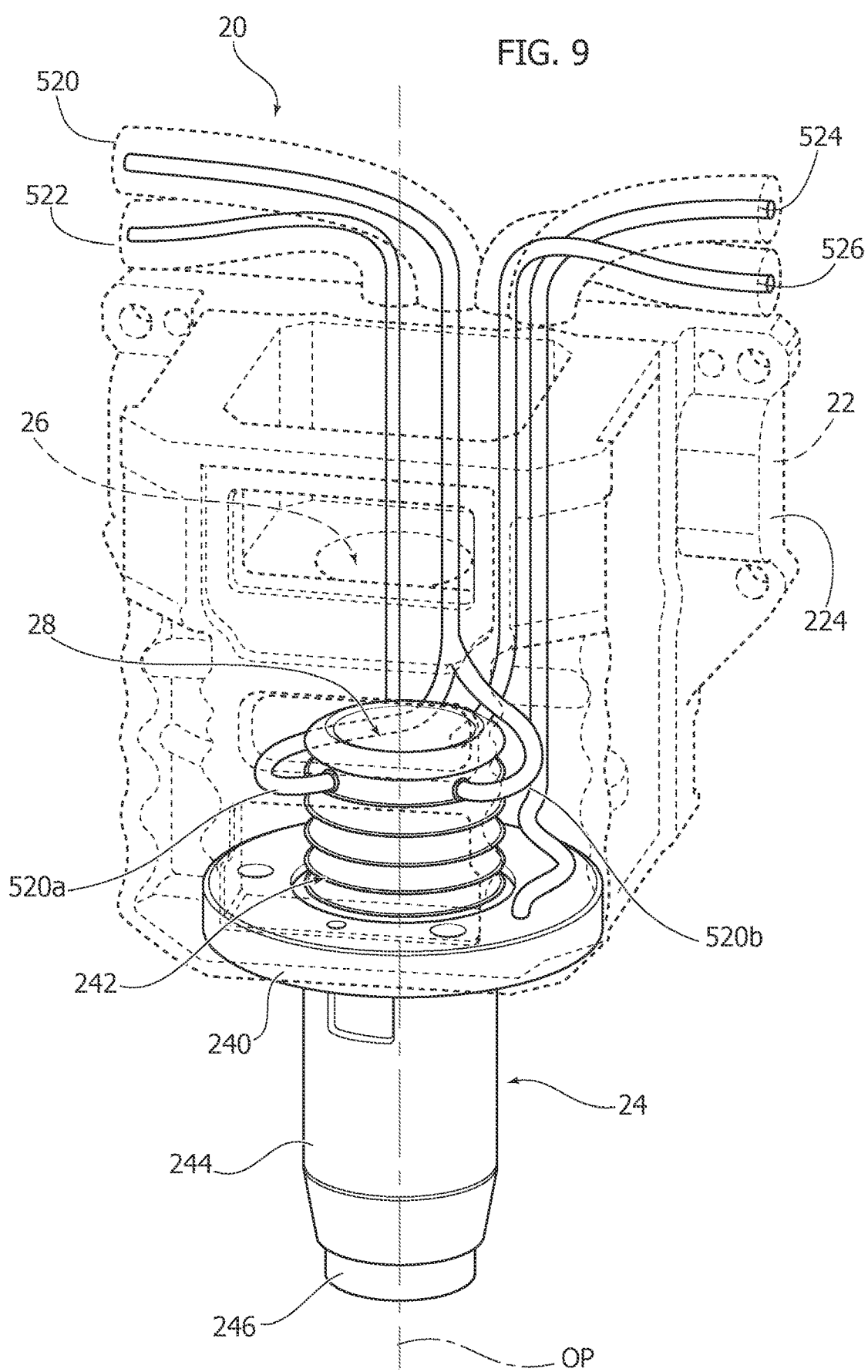

LASER END EFFECTOR, AND CORRESPONDING LASER MACHINE TOOL AND MANUFACTURING METHOD

This application claims priority to Italian Patent Application No. 102020000008386 filed Apr. 20, 2020, the entire contents of which are hereby incorporated by reference.

TECHNICAL FIELD

The present disclosure relates to an end effector for a laser machine tool configured to direct a laser beam onto a working surface along an optical axis of propagation of the laser beam.

The above end effector comprises a supporting body having a duct with an axis parallel to at least one portion of the optical axis of propagation of the laser beam and an end effector, which comprises a further duct and is configured to be coupled to the supporting body and to provide an outlet for the laser beam.

One or more embodiments may be applied in a laser machine tool, such as a laser-cutting machine.

TECHNOLOGICAL BACKGROUND

In the field of laser machining, there exist multiple devices for conveying electromagnetic radiation, commonly known as "laser (working) heads", which can be operated as end effectors of a laser machine tool. Each type of laser head may be specialized for carrying out a certain number or a certain set of laser machining operations at one and the same time. For instance, there may exist laser heads for laser welding, which differ from laser heads for laser cutting, in so far as the optical paths used may be different.

A laser head of this type is known, for example, from the document No. EP1134052A1 filed in the name of the present applicant.

There are known devices for providing radiation sources, in particular a laser source, in the form of a processing beam that can be set in contact with a workpiece so as to machine the material.

While the laser beam is used for carrying out a machining operation on a given material, part of the power emitted by the laser, on account of diffraction and diffusion of light (due to the coating of the optics used), dissipates in the form of heat within a duct for guiding the laser beam that is located within the end effector of the machine tool.

Each laser head can hence be designed to direct laser beams emitted by laser radiation sources with particular characteristics. For instance, in various laser heads such a value of power that can be used is limited to 20 kW resorting to conventional cooling methods.

A laser head may be configured to be coupled to ducts for distribution of machining process gases, such as inert gases that it is convenient to direct onto a working surface while the latter is being machined (for example, during cutting) using the laser beam.

The ensemble formed by the laser head together with the channels for distributing the gases that couple with it may hence present a considerable encumbrance. The laser head may also have a considerable weight, which can complicate the dynamics thereof in the working plane.

Lightening the weight of the aforesaid laser head, for example by reducing the amount of material used for producing it, could reduce the encumbrance thereof and improve its dynamics at the cost of a variation in the thermal cooling inertia. This cost could lead to a further limitation of the laser power that can be used for the machining operations.

OBJECT AND SUMMARY

An object of one or more embodiments is to provide a solution that will take into account the technical problems discussed previously.

According to one or more embodiments, the above object can be achieved by an end effector having the characteristics set forth in the ensuing claims. An end effector (or laser head) configured to be used as tool in a laser machine tool may be an example of such a tool device.

One or more embodiments may regard a corresponding apparatus. A machine tool comprising a laser head as discussed herein may be an example of such an apparatus.

One or more embodiments may regard a method of additive manufacturing and a corresponding laser head obtained using the method.

In the present disclosure and in the ensuing claims, by the term "additive manufacturing" is meant a technology, in itself known in the art, in which an energy source, such as a laser beam, is used for selectively fusing layers of powder of material of various size in such a way as to form, layer upon layer, a component of metal material or plastic material.

Some embodiments present the advantage of using heat exchangers for cooling, which lap as much of the surface as possible of a laser-radiation guide duct.

One or more embodiments make it possible to overcome the conventional limits of laser powers that can be used in laser machining operations, such as laser cutting.

One or more embodiments may envisage a new configuration of heat exchanger that will comprise a plurality of channels for the flow of a cooling liquid, where the channels each extend according to a tortuous path so as to increase the surface of heat exchange.

One or more embodiments enable increase in the efficiency of heat exchange given the same total volume of the heat exchanger.

One or more embodiments make it possible to provide a heat exchanger having a lighter structure, given the same heat-exchange efficiency, as compared to known devices.

The claims form an integral part of the technical teaching provided herein with reference to the embodiments.

BRIEF DESCRIPTION OF VARIOUS VIEWS OF THE DRAWINGS

One or more embodiments will now be described, purely by way of example, with reference to the annexed drawings, wherein:

FIG. 9 is a further perspective view of the laser head of FIG. 3;

DETAILED DESCRIPTION OF EXAMPLES OF EMBODIMENTS

In the ensuing description, one or more specific details are illustrated in order to provide an in-depth understanding of examples of embodiments of the disclosure. The embodiments may be obtained without one or more of the specific details or with other methods, components, materials, etc. In other cases, known operations, materials, or structures are not illustrated or described in detail so that certain aspects of the embodiments will not be obscured.

Reference to "an embodiment" or "one embodiment", in the framework of the present description, is intended to indicate that a particular configuration, structure, or characteristic described with reference to the embodiment is comprised in at least one embodiment. Hence, phrases such as "in an embodiment" or "in one embodiment" that may be present in one or more points of the present description do not necessarily refer precisely to one and the same embodiment.

Moreover, particular conformations, structures, or characteristics may be combined in any adequate way in one or more embodiments.

Figure 1:
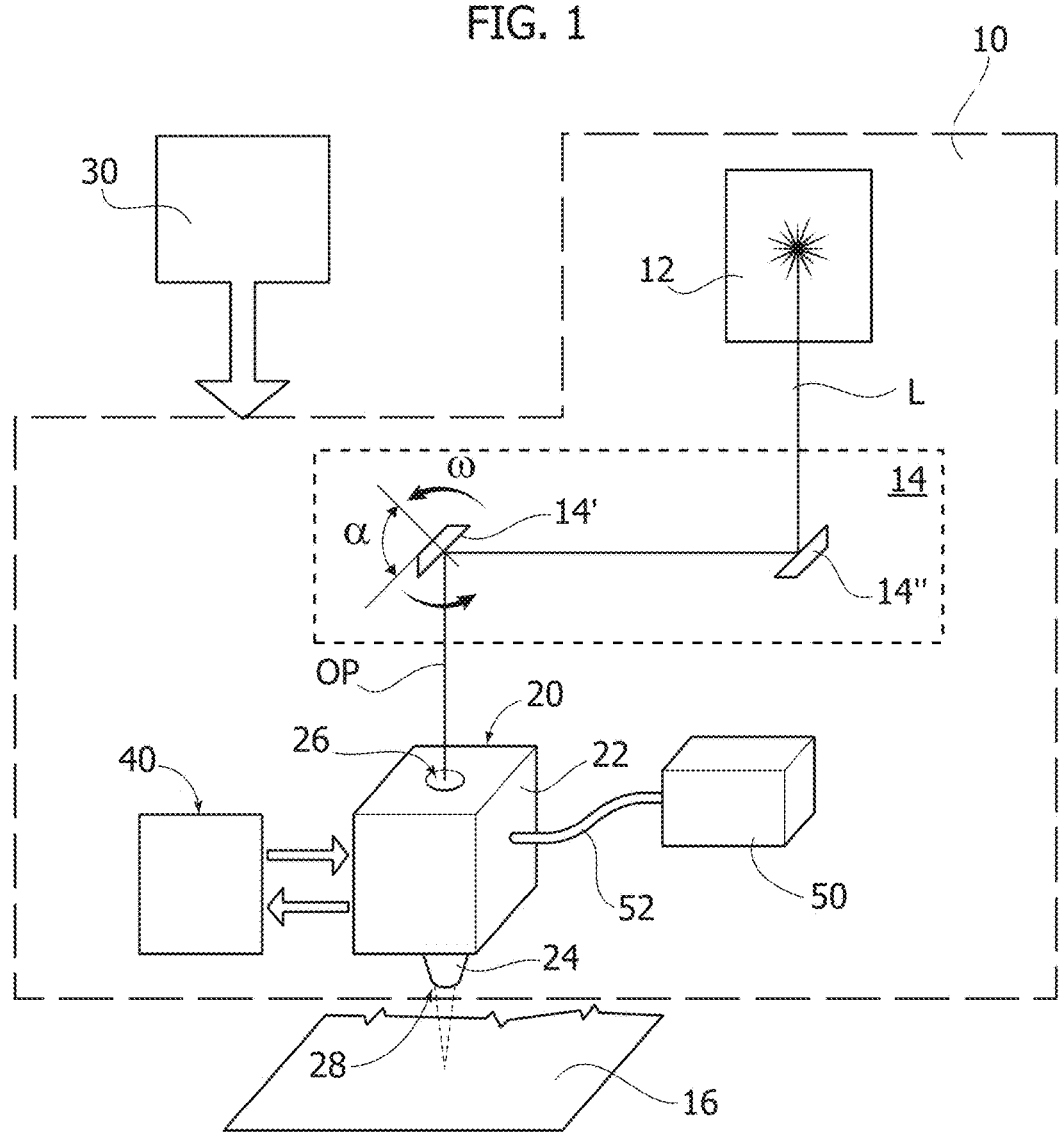
FIG. 1 is a diagram exemplifying a laser-machining apparatus.

The references used herein are provided merely for convenience and hence do not define the sphere of protection or the scope of the embodiments. Represented in FIG. 1 is a diagram of a laser-machining apparatus 10, or laser machine tool, comprising:

a laser source of electromagnetic radiation 12, configured to produce a laser beam L that propagates along an optical path;

a set of optical components 14 arranged along the optical path of the laser beam L and configured to divert the direction thereof, directing it along an optical axis OP towards a working surface 16 on which a component to be machined can be rested; and a laser head (or end effector) 20, which is configured to direct the laser beam and has a central duct 26 that surrounds at least one portion of the optical path of the laser beam L along the optical axis OP, this portion being configured so as to guide the laser beam towards the working surface 16, said laser head 20 being configured to be used as end effector of the laser machine tool 10.

For instance, such a machine tool 10 may comprise a conveying structure, which is configured to translate and/or rotate the laser head 20 and is of the cantilever type, of the robot-arm (anthropomorphic) type, or of some other type in itself known, as may be appreciated by a person skilled in the branch.

As has been mentioned, the laser head 20 is prearranged for receiving a laser beam L that propagates along an optical axis OP and for guiding it or conveying it inside it, in a (central) duct 26, as far as an outlet opening that enables use thereof on a working surface 16.

In particular, the apparatus 10 as exemplified in FIG. 1 may be prearranged for carrying out, in a flexible way, a plurality of different laser machining operations, amongst which in particular laser cutting, welding, cladding, direct-energy-deposition (DED) additive manufacturing, ablation, thermal treatment, texturing.

It should be noted that the aforesaid list of possible laser machining operations and the aforesaid combinations of machining operations with the sources are presented purely by way of example, i.e., without any limitation on the types of laser machining for which the apparatus can be prearranged for operating in a flexible way.

In the present description, by the term "additive manufacturing" is meant a method, known to the art, where it is envisaged to deposit in sequence layers of powdered material and use an energy source, such as a laser beam, to fuse or sinter selectively regions of the layers of powdered material, as it is deposited, in such a way as to form, layer upon layer, a component of a certain material (for example, metal or plastic). The layers of powder may, for example, be powder beds in which a laser beam selectively operates by fusion or sintering, or else may be strips and spots of powder deposited via a nozzle in the region of action of the laser beam.

For instance, the aforesaid laser head 20, as illustrated in FIG. 1, may have a supporting structure, which comprises:

a supporting body 22, comprising the central duct 26, for example tubular, which may include a coupler configured to couple the head 20 mechanically to the conveying structure, for example, to the robot arm of the machine tool 10; the tubular central duct 26, the main axis of which in the example illustrated is substantially perpendicular to a working surface 16, is configured to receive the laser beam L and guide it towards the working surface 16; and an outlet part, or sensor cone, 24 comprising inside it a duct 28 having a frustoconical shape comprising an inlet opening, which constitutes the major base of the duct having a conical shape, from which it receives the laser beam L, downstream of the central duct 26 of the supporting body 22, and an outlet opening 28a, i.e., the minor base, which faces the working surface 16 for transmitting the laser beam L.

In various embodiments, the laser head 20 may include within it the optical components 14. These optical components (or modules), as has been said, convey the laser beam L coming from the laser source 12 so that it will impinge upon the working surface 16 according to the optical axis OP, which is usually substantially perpendicular to the surface 16. The optical components 14 may be orientable (i.e., mobile) so as to direct the laser beam L onto the working surface 16, for carrying out specific functions of the machining process and for following movements of the laser head 20, in particular determined by the conveying structure of the machine tool 10. The set of optical components 14 may comprise, for example:

a module for orienting the laser beam, designated by 14' in FIG. 1, configured to impart on the laser beam L at least one dynamic movement of oscillation ω about the optical axis OP once the laser beam is emitted by the laser head 20 on the working surface 16; represented in particular in FIG. 1 is a fixed mirror 14", which deflects for a first time the beam originating from the source 12 onto the module 14', which is controlled for orienting the laser beam L within the duct 26;

a beam-shaping optics, for example a diffractive lens for varying a (resonant) mode of the laser beam L, i.e., configured to vary selectively a distribution of power of the laser beam directed onto the region of the machining surface; and a focusing lens, configured to direct the laser beam L onto a region of the working surface 16 to form a focusing spot of the laser beam on the aforesaid region.

In general, by "machining surface/plane" 16 is meant the surface/plane at the height at which the process is carried out, in particular the surface/plane that may also be that of the support or element on which machining is being carried out.

It should be noted that the set of optical components 14 is presented purely by way of non-limiting example, it remaining, on the other hand understood that in various embodiments one or more of the elements 14 could be different or absent according to the requirements of a user so as to be able to configure the apparatus 10 according to the requirements of the types of machining to be carried out.

The module for orienting the laser beam in the set of optical modules 14 may comprise, for example, a mirror that can be oriented via one or more actuators coupled thereto, for example galvanometric actuators configured to vary at least an angle of inclination thereof via an optical scanner. For instance, the optical scanner may envisage driving at least one actuator of the orientable mirror according to a procedure for imparting a dynamic movement on the laser beam L, for example by varying with a frequency ω at least one angle α between an axis normal to a reflecting surface of the mirror and a direction of propagation of the laser beam L, i.e., the optical axis OP. Such a procedure may be implemented, for example, in ways in themselves known.

It should be noted that, even though the aforesaid optical components have been described as being comprised in the head, in various embodiments they might not be present or be provided outside the head; in particular, the module for orienting the laser beam could be located at the inlet of the head but mechanically uncoupled therefrom.

The apparatus 10, as exemplified in FIG. 1, further comprises a cooling system 40, for example a heat exchanger integrated in the supporting body 22 of the laser head 20, as discussed in what follows. The cooling system may be configured to supply a flow of a cooling fluid, for example water, at inlet to and at outlet from the respective inlet and outlet chambers in the supporting body 22, as discussed in what follows.

Some laser machining processes use, in addition to the laser beam, also fluids or gases for carrying out the machining operation. The apparatus 10, as exemplified in FIG. 1, may hence comprise a system 50 for distribution of such assist gases. In particular, in the case of laser cutting operations, it is possible for the laser head 20 to comprise integrated ducts configured to supply an assist gas for the machining process that can be introduced into the end part 24 of the laser head 20 so that the gas exits from the same outlet hole 28 as the laser beam L (for example, in a way coaxial thereto), as discussed in what follows. The laser head 20 in the apparatus 10, as exemplified in FIG. 1, is hence connected to one or more flexible tubes 52, so that the tubes 52 will be able to supply a flow of gas to the central duct 26.

In various embodiments, the apparatus may comprise further modules, such as a control module 30 for driving, for example, one or more of the following:

the laser source 10, so as to produce a beam L with given characteristics;

the optical components 14, for example for applying rapid oscillations to the beam in order to obtain improved machining results, in ways in themselves known;

the structure for carrying the laser head 20, so as to displace the latter for carrying out programmed machining operations on the workpiece resting on the working surface 16; and the cooling system 40 or the gas-distribution system 50.

In various embodiments of the apparatus 10, for example, a portion of the laser beam L may be deviated and analysed, possibly applying a feedback to the source 10 via the control module 30 as a function of the analysis.

Figure 2:
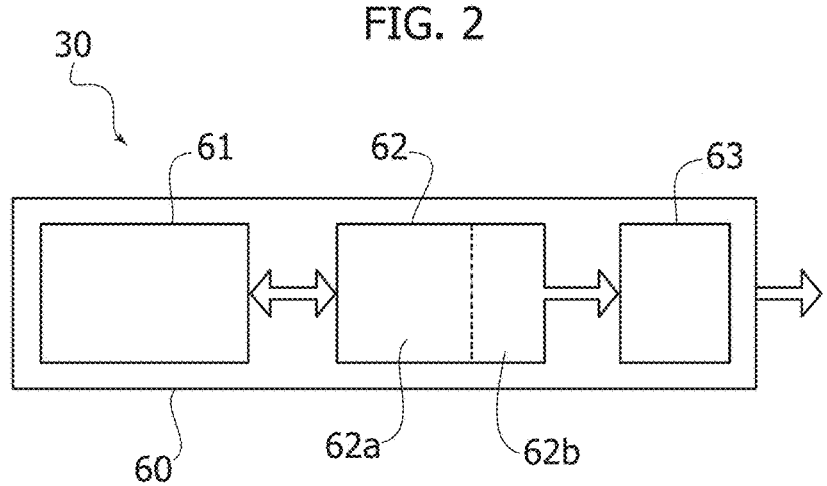
FIG. 2 is a diagram exemplifying a control module of the laser-machining apparatus of FIG. 1.

In various embodiments, the control module 30 may comprise a numeric control unit 60, as exemplified in FIG. 2.

In one embodiment, a machine tool (10) for laser machining processes, preferably for laser-cutting processes, includes:

at least one laser source (12, 14) configured to produce at least one laser beam (L);

an end effector (20);

one or more axes moved by one or more actuators coupled to the end effector (20); and a processing module (30), which includes at least one numeric control unit (60) and is coupled to the one or more actuators of the laser machine tool (10) for driving the actuators to move the end effector (20) on a working surface (16) in order to carry out at least one laser machining process.

The numeric control unit 60 may be configured to manage control of the actuators, i.e., the motors such as the motors of the conveying structure that move the axes thereof, the motors that move the laser-beam-orienting module 14, as well as further systems such as the cooling system 40 or the system 50 for distributing the assist gas.

The above unit 60 may comprise a first computer 61, which operates as user interface for sending instructions and commands to a second computer 62. The second computer preferably comprises an operating system 62a associated to extensions 62b of a real-time type for management of the machine 10. The operating system may, for example, be of a Linux type, WinCE type, or else be obtained via proprietary solutions.

Implemented in the computer 62 and in the servo-control card 63 are, for example, procedures for driving the apparatus 10. The computer 62 can provide the paths to be followed to a servo-control card 63 for control of the actuators.

Figure 3:
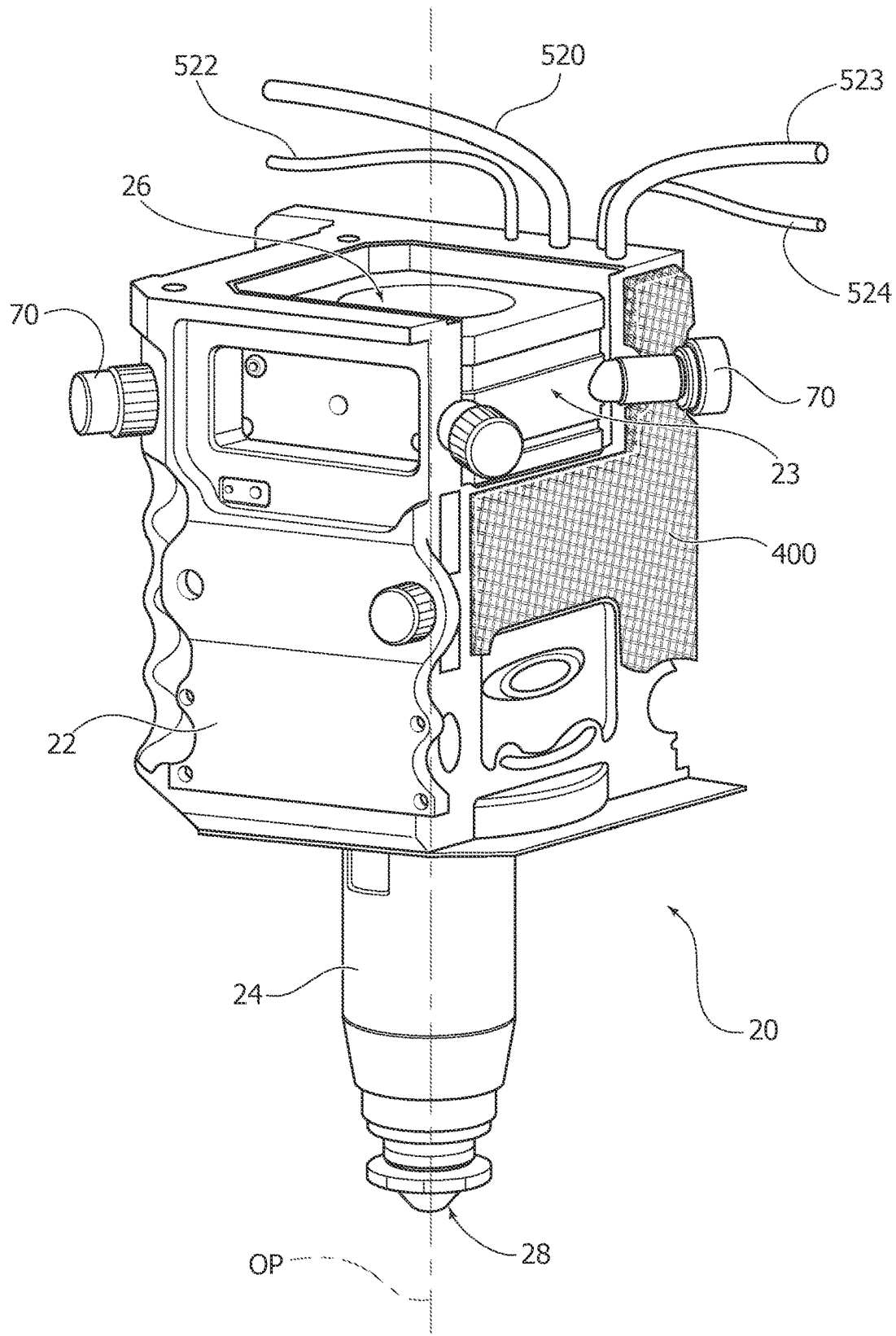
FIG. 3 is a partially sectioned perspective view of a laser head according to one or more embodiments.

FIG. 3 shows a perspective view of the laser head 20, visible in which is an internal section of the supporting body 22.

The supporting body 22 may be made of metal material, preferably aluminium alloys, titanium alloys, or nickel alloys.

In particular, the supporting body 22 may be obtained via a process of additive manufacturing, so as to render it easy to obtain complex structures integrated therein, as discussed in what follows.

In the sequel, for simplicity, reference will be made to a head 20 comprising a supporting body 22 obtained with additive-manufacturing technology of the powder-bed-fusion type, it remaining, on the other hand understood that this type of additive technology used is provided purely by way of non-limiting example.

In providing various embodiments, it is possible to use other additive-manufacturing procedures, such as binder jetting, electron-beam melting, material extrusion, material jetting, and other procedures in themselves known to the person skilled in the branch.

Preferably, the supporting body 22 may be obtained using additive-manufacturing technology configured to fuse layers of material having a thickness substantially equal to 30 μm (1 μm=1 micrometer=$10^{-6}$ m).

Figure 16:
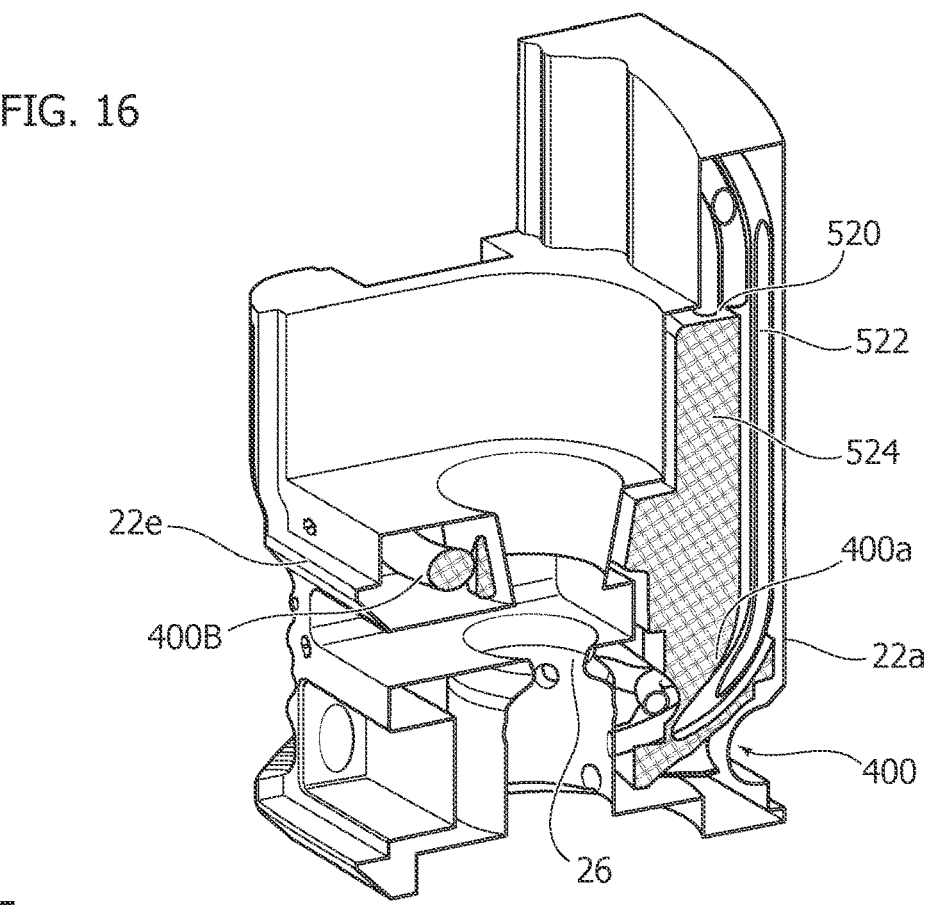
FIG. 16 is a perspective view of a section according to the line XVI-XVI of FIG. 15.

As exemplified in FIG. 3, the supporting body 22, which has a parallelepipedal shape in the example, comprises inside it a tank 400, which surrounds the central duct 26. The central duct 26, which is more clearly visible in FIG. 4 or in FIG. 16, is surmounted by a positioning tray 23, which has a substantially parallelepipedal shape, and is provided with a cylindrical hole of its own substantially having a cross section congruent with that of the central duct 26, which comprises optics for focusing the laser beam L and regulates the position thereof.

FIG. 3 moreover shows that the supporting body 22 further comprises a set of tubular ducts 520, 522, 523, 524 for conveying fluids for assisting laser machining. The set of tubular ducts may be coupled to one or more systems 50 for distributing gases or other machining assist elements.

For instance, as exemplified in FIG. 3, the set of tubular ducts 520, 522, 523, 524 may comprise:
  a first tubular duct 520 configured to convey a laser-cutting assist gas, such as oxygen;
  optionally, a second tubular duct 522, configured to convey a laser-cutting assist liquid, for carrying out water-assist cutting (WAC);
  optionally, a third tubular duct 523 configured to convey further assist gases, such as nitrogen gas for nitrogen piercing; and
  a fourth tubular duct 524 configured to convey cooling air.

It should be noted that such a set of four tubes is provided purely by way of non-limiting example, it remaining, on the other hand, understood that in various embodiments any number of ducts for distributing gases and other assist elements 520, 522, 523, 524 may be coupled to the laser head 22 and integrated therein.

A laser head 20, as exemplified in FIG. 3, further comprises one or more regulators 70, i.e., screw-type regulators, configured to be coupled to one or more of the optical focusing elements of the tray 23, which in general form part of the optical elements 14 so as to vary in a fine way alignment thereof within the duct 26 and the consequent properties of optical focusing of the laser beam L that propagates along the optical path OP.

Figure 4:
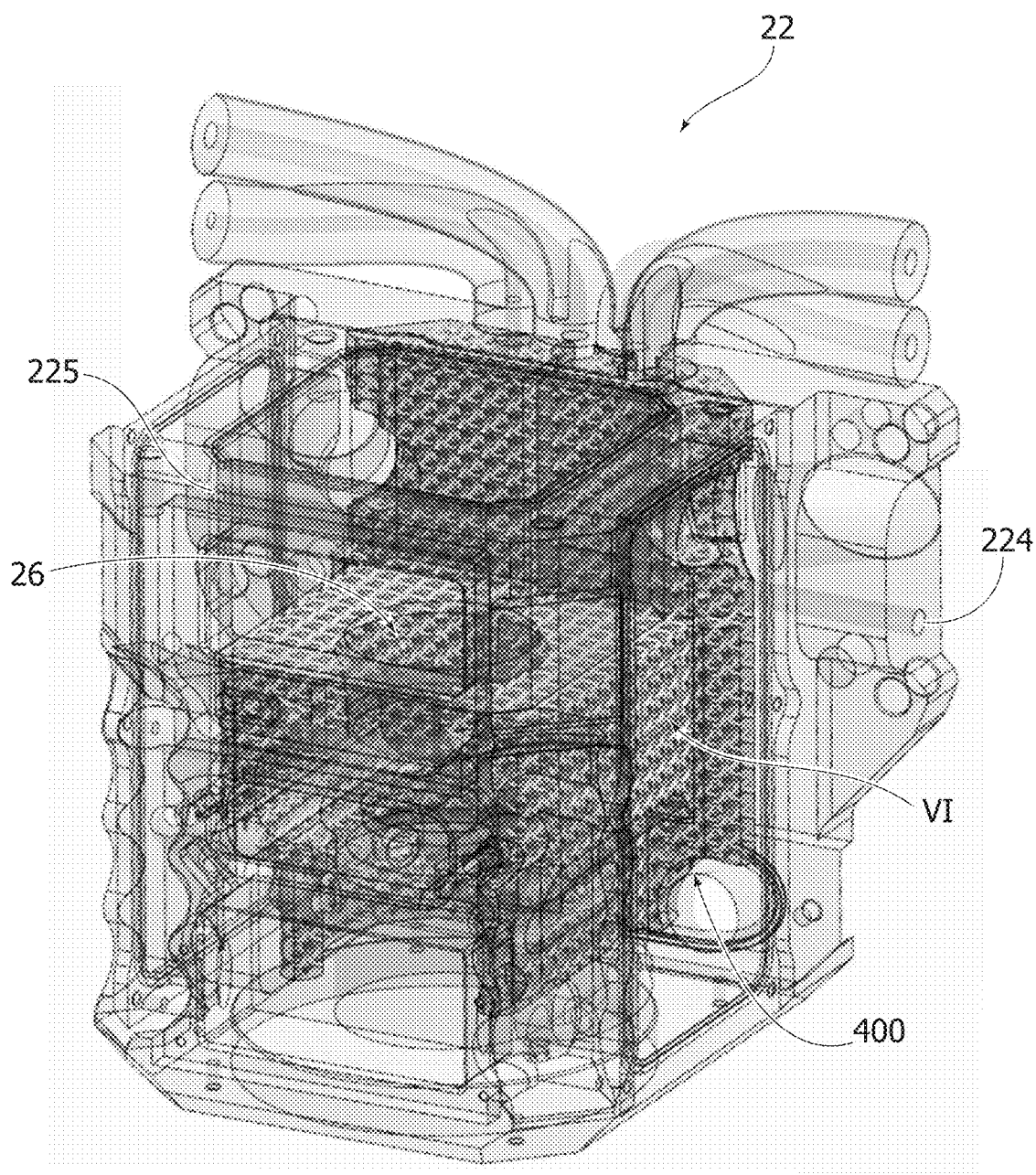
FIG. 4 is a perspective view of a supporting body of the laser head of FIG. 3.

FIG. 4 is a front view of just the supporting body 22 of the laser head 24, delineated in which is a portion of volume of heat exchanger 400 (with the outer structure of the structure of the supporting body 22 represented with dashed lines).

As exemplified in FIG. 4, the above heat exchanger 400 surrounds the tubular duct 26 that passes through the supporting body 22.

In various embodiments, as exemplified in FIG. 4, the cooling system 40 may be coupled to the supporting body 22 via an inlet chamber 224 and an outlet chamber 225, which are configured, respectively, to receive the cooling liquid at inlet and send it back at outlet.

Figure 6:
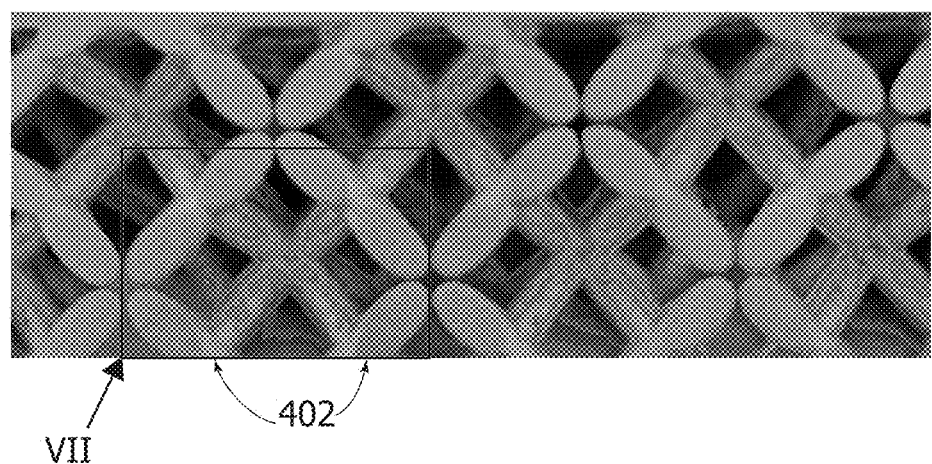
FIG. 6 is a view of the box indicated by the arrow VI in FIG. 4.
Figure 7:
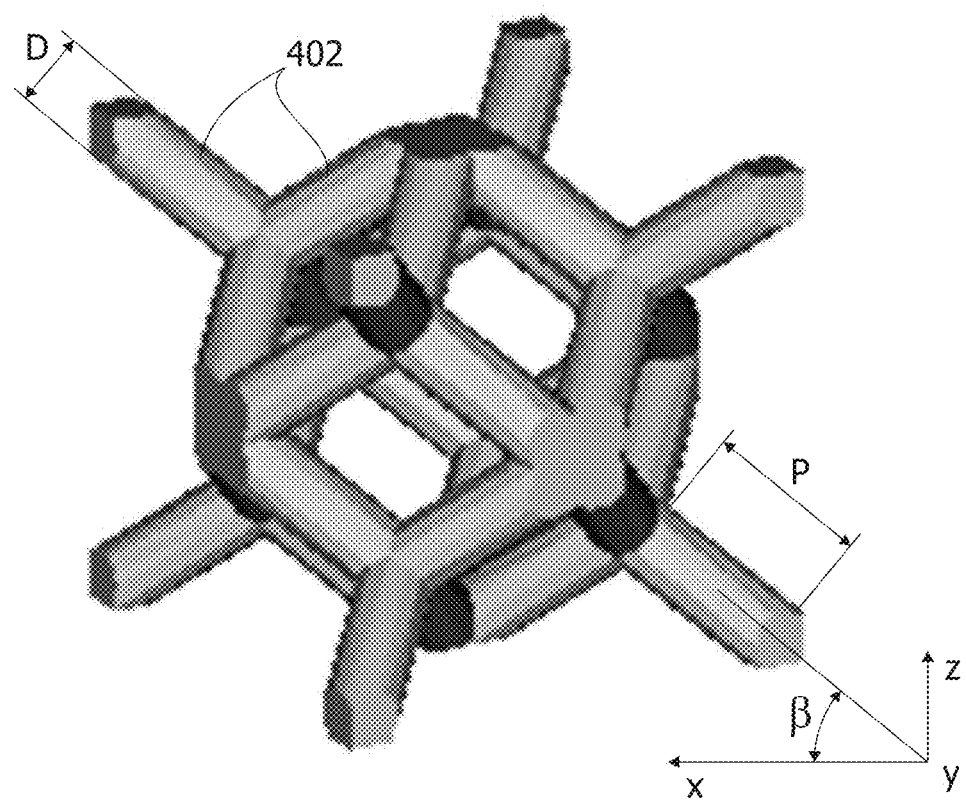
FIG. 7 is a perspective view of the box indicated by the arrow VII in FIG. 6.

As discussed in the sequel, the volume of the heat exchanger 400 comprises a lattice or mesh structure inside it. The lattice structure may comprise, as illustrated in FIG. 6 or FIG. 7, a plurality of cells of thermally conductive connector elements, for example arranged in a three-dimensional network. In variant embodiments, this arrangement may create a two-dimensional network. The mesh or lattice may offer an extensive thermally conductive surface configured to transfer the heat that is dissipated on the walls of the duct 26 (for example, while it is traversed by the laser beam L during one or more machining operations).

The cooling liquid supplied by the cooling system 40 flows inside the heat exchanger 400 passing between the inlet chamber 224 and the outlet chamber 225. While it flows, the liquid extracts the heat both directly from the portions of duct 26 that the heat exchanger 400 laps and the heat that is "carried away" by the structure of the lattice (which occupies the three-dimensional volume of the tank) given that the cooling liquid passes through the gaps in the mesh of the lattice, as discussed in what follows (for example with reference to FIG. 8).

Figure 5:
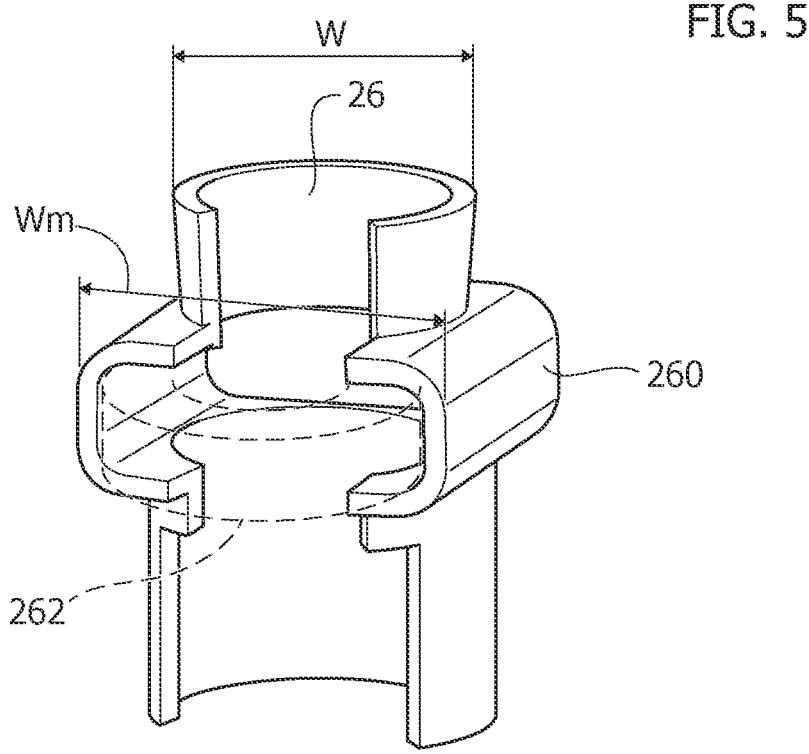
FIG. 5 is a partially sectioned view of a duct in the supporting body of FIG. 4.

FIG. 5 is a partially sectioned perspective view of the internal volume of the duct 26 within the supporting body 22 according to some embodiments.

As exemplified in FIG. 5, the duct 26 has inside a cylindrical tubular shape, a portion 260 of which has a swelling so as to function as housing 260 for a cylindrical body made of glass, hereinafter also referred to as "glass", 262 that protects the optical components upstream, such as an optical lens for focusing the laser beam L, from potential damage during machining.

The cylindrical tube of the duct 26 has, for example, a first diameter W, whereas the toroidal housing 260 for the glass 262 has a second diameter Wm greater than the first diameter W.

Advantageously, the presence of to swelling facilitates insertion of the protective glass in the duct of the supporting body 22 via a mechanical-slotting mechanism, thus simplifying the coupling mechanisms. FIG. 6 shows a portion of the internal structure of the tank 400 within a box indicated by an arrow VI in FIG. 4.

As exemplified in FIG. 6, the lattice or mesh structure of the heat exchanger 400 comprises a plurality of thermally conductive elements, or connector elements 402, i.e., rectilinear segments (that is, in the form of rods or bars), which are in particular substantially cylindrical, full, and made of metal material and are interconnected. The segments are thermally conductive and arranged so as to create a network that occupies a three-dimensional volume, which can be obtained by periodic spatial repetition (e.g., a two-dimensional or three-dimensional spatial repetition) of unit cells. The mesh or lattice offers a surface for dissipation of the heat that is present on the walls of the duct 26 while the latter is traversed by the laser beam L during one or more machining operations. In other words, the lattice structure of the heat exchanger 400 acts as a porous wall in the gaps of which the cooling liquid flows.

The lattice structure of the heat exchanger 400 may comprise a set of substantially identical cells. For instance, each cell may have the shape of a skeleton of a polyhedron, of which the connectors 402 represent the edges. In variant embodiments, each cell may even have a two-dimensional or three-dimensional shape, regular or irregular, polygonal or polyhedral.

FIG. 7 shows a perspective view of the three-dimensional structure of a single cell of the plurality of cells substantially identical to one another, for example the cell in the box VII of FIG. 6.

As exemplified in FIG. 6, the single cell of the lattice structure of the tank 400 may have the shape of a skeleton of a rhombic or trapezo-rhombic dodecahedron.

It remains, on the other hand, understood that such a polyhedral shape is presented purely by way of example, given that the individual cell of the lattice structure of the tank 400 may have virtually any shape, whether regular or irregular, in particular any shape that can be obtained via an additive-manufacturing process.

The lattice structure of the tank may be parameterized according to the dimensions of the cell, which may comprise, as exemplified in FIG. 7: a diameter D of the connector 402, a length or pitch P, and an angle of inclination β with respect to a plane (for example, a horizontal plane).

In various embodiments, the diameter D of the connectors 402 of the cells may preferably be comprised between 0.5 mm and 1 mm (1 mm=1 millimetre=$10^{-3}$ m), so as to allow flow of the cooling liquid within ducts for passage of the cooling fluids in the lattice structure of the heat-exchanger tank 400.

In one or more embodiments, the lattice preferably has a mesh pitch P comprised between 4 mm and 10 mm.

In various embodiments, the cells of the lattice of the heat-exchanger tank 400 may be inclined with respect to a horizontal plane, preferably by an angle β greater than 40°.

The above embodiments present the advantage of having a very large number of thermally conductive connectors per unit surface of the cross section of the heat exchanger 400 and consequently a very high value of heat-exchange surface, given the same volume.

Figure 8:
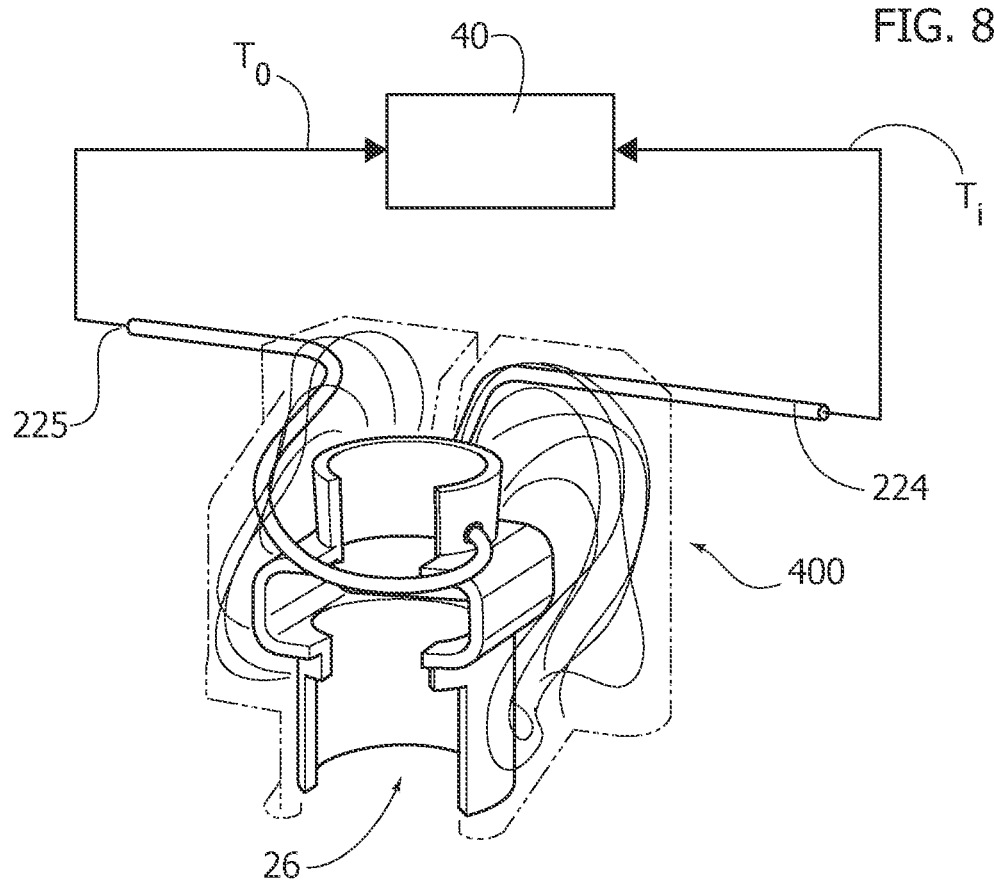
FIG. 8 is a diagram illustrating principles of operation of one or more embodiments.

FIG. 8 is a simulation of the flow of cooling liquid, for example water, which can occur within the heat-exchanger tank 400 of the supporting body 22 coupled to the cooling system 40 via the inlet chamber 224 and the outlet chamber 225.

As exemplified in FIG. 8, the cooling system 40 supplies a liquid at a first temperature, e.g. Ti, to the inlet chamber 224, from which it flows following the intricate lines of flow, lapping the side walls of the duct 26 inside the supporting body 22 and propagating in the meshes of the network that occupies the three-dimensional volume of the tank 400, extracting therefrom the heat that may be present on account of the power of the laser dissipated during machining. The flow of cooling liquid then proceeds towards the outlet chamber 225, from which it is brought back to the cooling system 40 at a second temperature To higher than the first temperature Ti.

As exemplified in FIG. 8, the cooling liquid, for example water, traverses the volume of the heat exchanger 400, which operates as a sort of tank. The cooling liquid, as has been said, passes from the inlet chamber 224 to the outlet chamber 225, so that the internal volume of the heat exchanger 400 is coupled to the cooling system 40 via two parts of a tube, in which cooling liquid flows, in such a way as to enable circulation of the flow within the tank 400.

The cooling liquid, for example water, flowing in the tubes within the tank 400, carries away the heat generated by the laser beam that follows its optical path OP from the walls of the duct 26. This can contribute, in particular, to safeguarding the properties of the focusing optics and of the glass 262, the focal distance of which for focusing of the laser may, for example, be particularly sensitive to temperature variations. This may moreover contribute to safeguarding the mechanical properties of the laser head 20.

The increased effectiveness of the lattice heat exchanger 400 in dissipating the heat produced by the laser in the duct 26 (and in the lens 262) facilitates use of lasers with powers higher than the ones commonly used, for example reaching a power of the laser beam L of around 20 kW (1 kW=$10^3$W=1 kilowatt).

Thanks to the adoption of additive-manufacturing technology, the structure of the connectors 402 of the heat exchanger 400 can be obtained inside the supporting body 22, which would otherwise be difficult to obtain at a low cost using other technologies. The additive-manufacturing technology also makes it possible to provide the body of the heat exchanger 400 with a desired general conformation, different from that of conventional heat exchangers.

FIG. 9 is a perspective view of the laser head 20 in which the outer structure of the supporting body 22 is delineated with dashed lines and where the structures internal to the laser head 20 of the set of tubular ducts 520, 522, 523, 524 are visible.

The above tubular ducts 520, 522, 523, 524 extend from a top of the supporting body 22 almost as far as the bottom of the body itself, in a way substantially parallel to one another and linearly extensive, until they give out into the duct 26 inside the supporting body 22 and/or inside an interface for coupling with the sensor cone 24.

As exemplified in FIG. 9, the sensor cone 24 may have its tubular internal duct 28 for guiding the laser beam divided into two portions with respect to the position of a central plate 240, or flange, with a circular base. The body 22 comprises a corresponding circular seat 222 in its own bottom portion underneath the duct 26, in which the flange is inserted for coupling the sensor cone 24 to the body 22. The seat 222 is visible also in FIG. 4, where the sensor cone 24 is absent.

Figure 14:
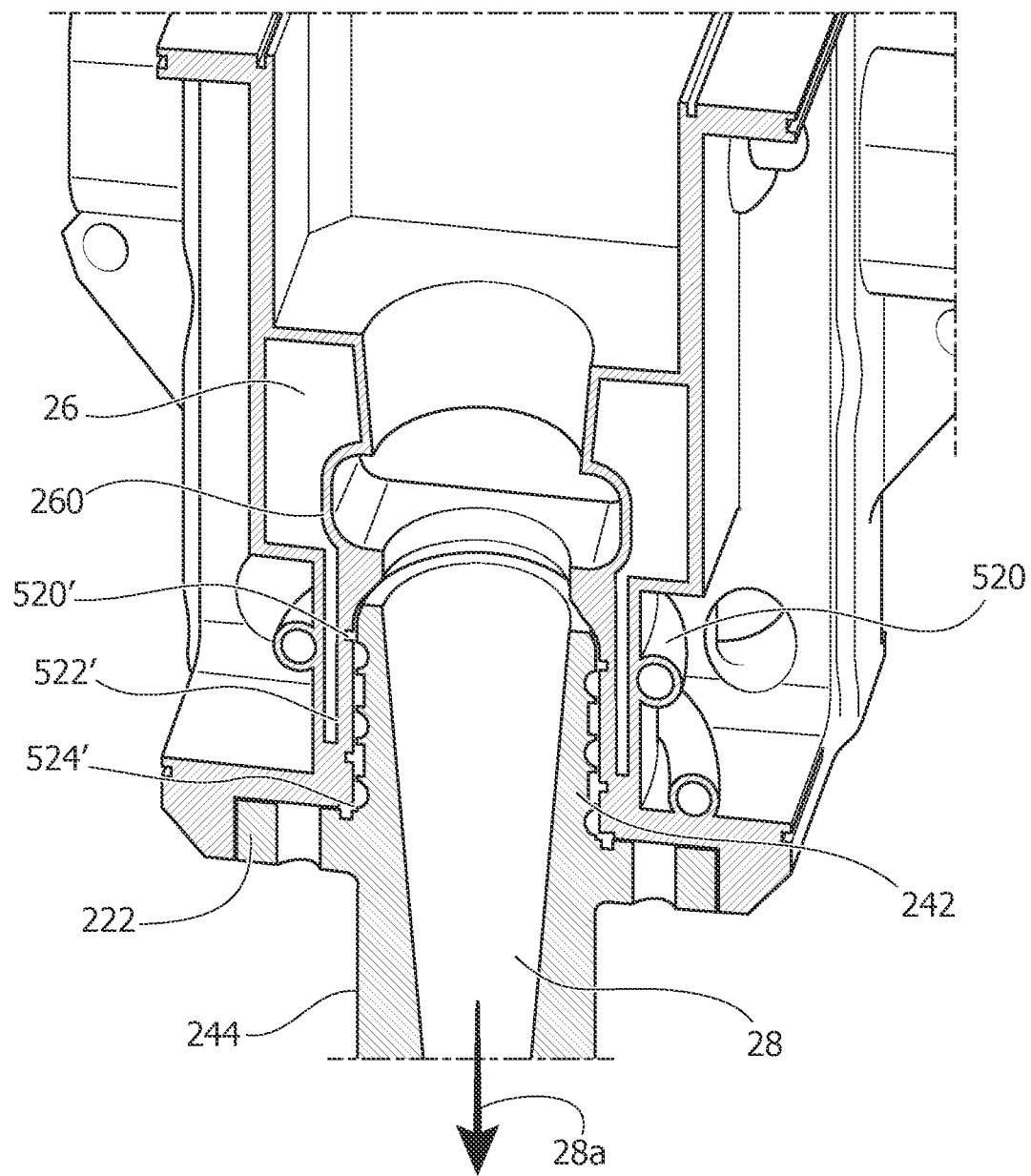
FIG. 14 is a perspective view sectioned according to the line XIII-XIII of FIG. 10.

For instance, as exemplified moreover in FIG. 14, the duct 28 internal to the sensor cone 24 may comprise:
  a first duct portion 242, which is substantially cylindrical both in the outer wall and in the inner wall, for example a top portion with respect to the plate 240, and is configured to couple with an end portion of the duct 26 inside the laser head 20 and comprises a plurality of chambers 520', 522', 524' for coupling with at least one of the tubular ducts, for example the one designated by 520, the chambers 520', 522', 524' being in turn in communication with the inside of the sensor cone 24, i.e., the duct 28, in particular through holes 521 in the chambers that give out into the duct 28; and
  a second duct portion 244, for example a portion set underneath the plate 240, which has a distal part 246 tapered as far as the outlet hole of the laser beam L; inside the second portion 244 the duct 29 likewise has a progressive narrowing of the diameter downwards, following a substantially frustoconical shape.

In various embodiments, as exemplified in FIG. 9, in the vicinity of the first portion 242 of the sensor cone configured to couple to the duct 26 of the supporting body 22, at least one of the tubular ducts, for example the first tubular duct 520, branches off into a plurality of distribution sub-ducts.

For instance, the first tubular duct 520 can branch off into four internal distribution sub-ducts, two of which are visible in FIG. 9 designated by the references 520a, 520b, as discussed hereinafter (for example, in regard to FIG. 11).

Figure 10:
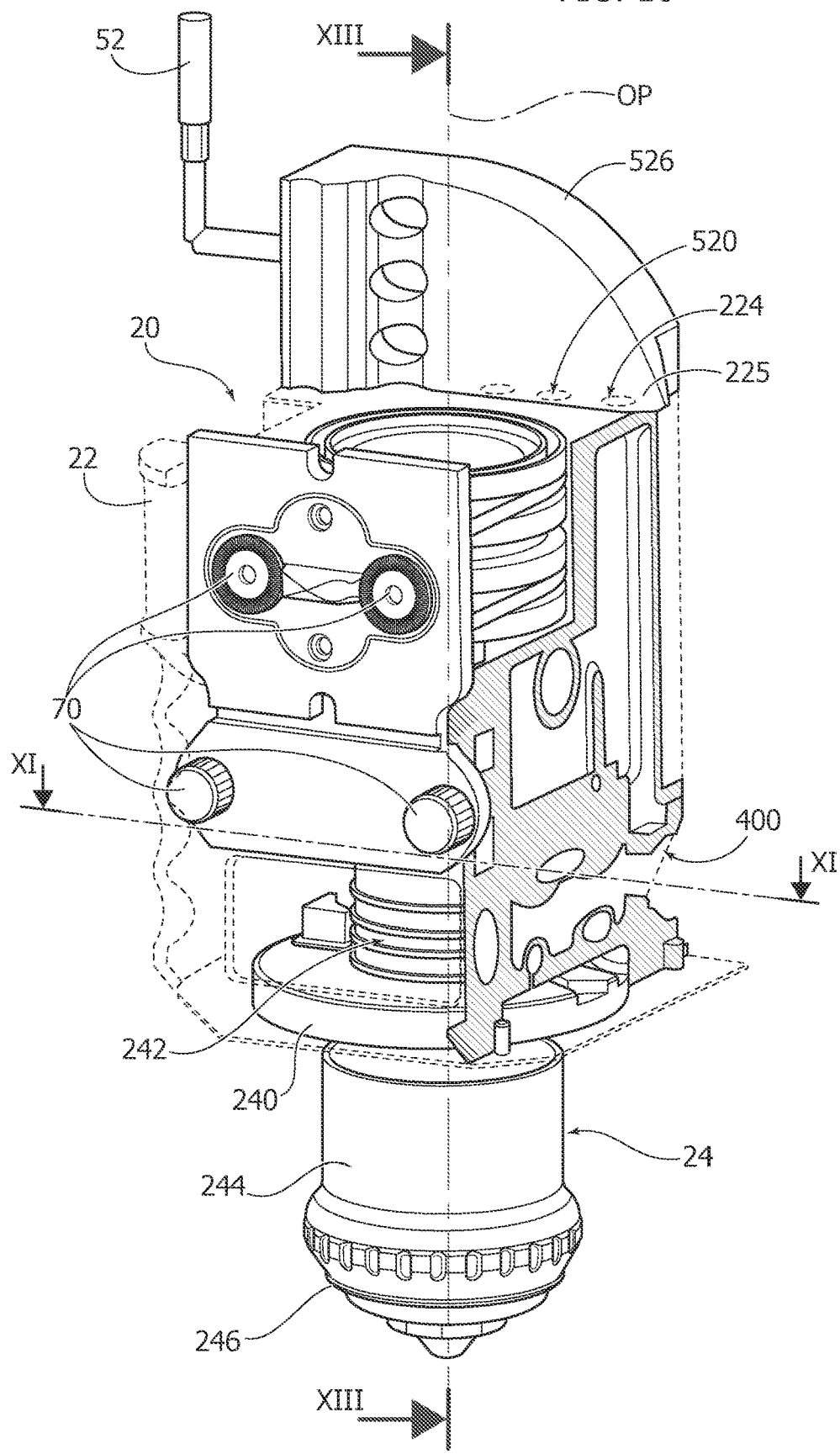
FIG. 10 is a partially sectioned perspective view of a laser head according to one or more embodiments.

FIG. 10 is a perspective view of the laser head 20, visible in which is a partial cross section of the supporting body 22.

As exemplified in FIG. 10, the laser head 20 may comprise a collector 526 configured to convey towards the respective ducts of the head 22 one or more tubes 52 of systems 50 for supplying machining assist gases or other assist fluids, as well as tubes of the cooling system 40 for distribution of the cooling liquid for connection with the inlet/outlet chambers 224, 225 of the heat exchanger 400.

For instance, the collector 526 may comprise ducts for coupling the system for distribution of laser-cutting assist gas to the respective distribution ducts inside the laser head 20, for example to the first distribution duct 52 of the set of distribution ducts 520, 522, 524, 523 located inside the supporting body 22.

Figure 11:
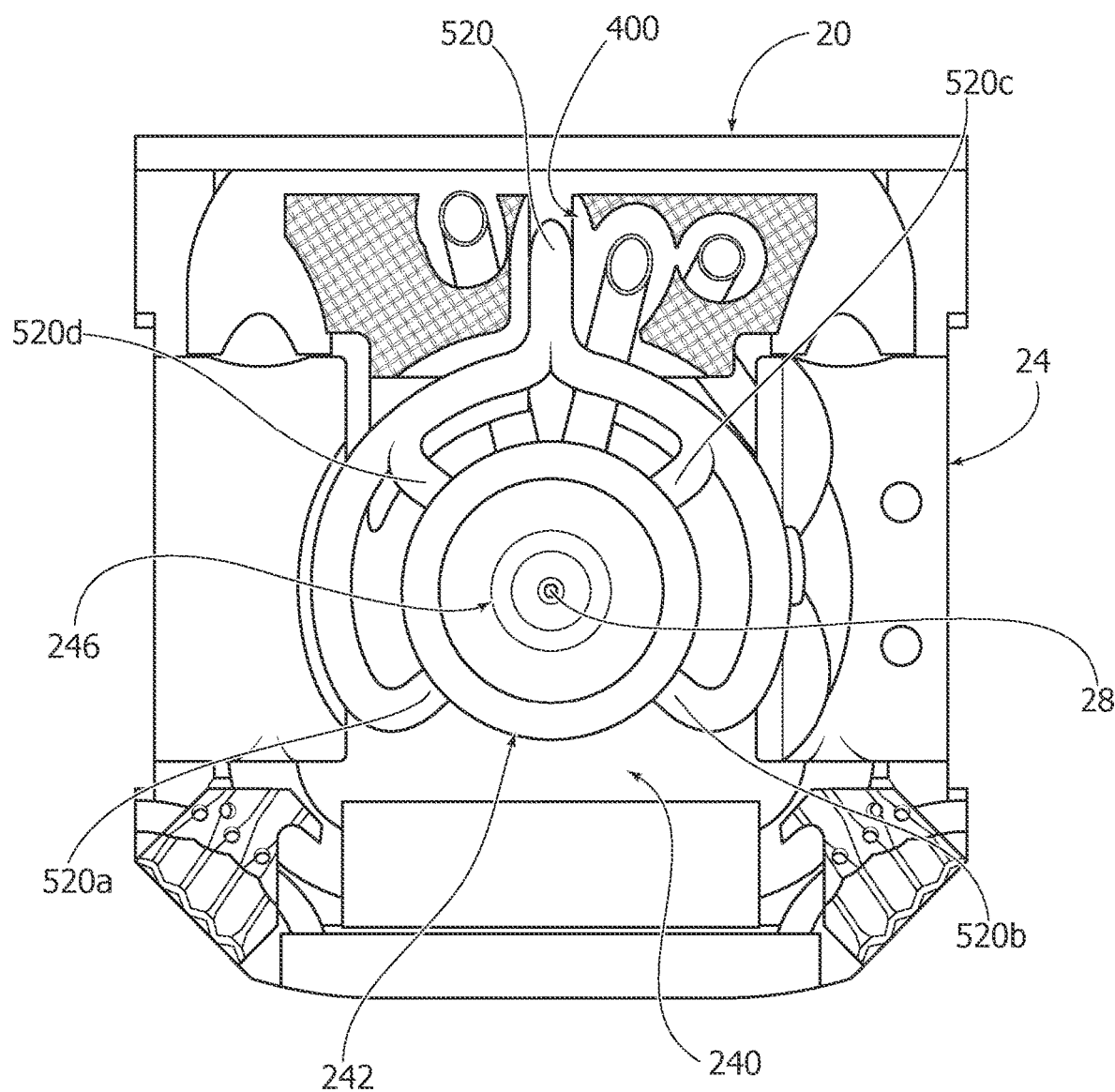
FIG. 11 is a cross-sectional view along the line XI-XI in FIG. 10.

FIG. 11 is a view from above of a section along a plane XY (orthogonal to the optical axis OP of propagation of the laser beam L), that passes through the line indicated by the arrows XI-XI of the laser head 20 of FIG. 10.

Visible in the view of FIG. 11 is the inside of the second portion of the internal duct 28 of the sensor cone, in particular the tapered part 246 or tip, which creates a housing for the outlet nozzle for the gases and the laser beam.

Highlighted in the above horizontal section is the tank 400a in which the tubular ducts 520, 522, 524 pass.

As exemplified in FIG. 11, the distribution duct 520 for the machining assist gas may comprise four branches 520a, 520b, 520c, 520d that can be configured in such a way as to couple to the first portion 242 of the cylindrical internal duct 28 of the sensor cone 24 at respective four points arranged at one and the same height on the circumference identified by the circular edge of the first portion 242 of the internal duct 28 at equal distances from one another, i.e., each arc of the circumference between two points subtends a right angle located on the circular edge. Hence, in this way the assist gas, for example oxygen, is distributed in a uniform way in the chamber. The configuration of the branches 520a, 520b, 520c, 520d may hence be made in such a way as to facilitate uniform distribution of the laser-machining assist fluid within the duct 26, 28 for propagation of the laser beam, in particular in the portion of the duct 28 within the sensor cone 24, or else according to other configurations that may be necessary.

Using an additive-manufacturing process, it is possible to obtain flexible geometries of the branches, which may be, at least virtually, of any number and shape.

As has been mentioned, having a set of branches 520a, 520b, for example four branches of the tubular duct for distributing the laser-cutting assist gases may slow down the gas and reduce its turbulence, thus facilitating fluid-dynamic coupling between the sensor cone 24 and the embodiment itself.

In various embodiments, the sensor cone may be obtained with additive technology or with traditional technologies.

Figure 12:
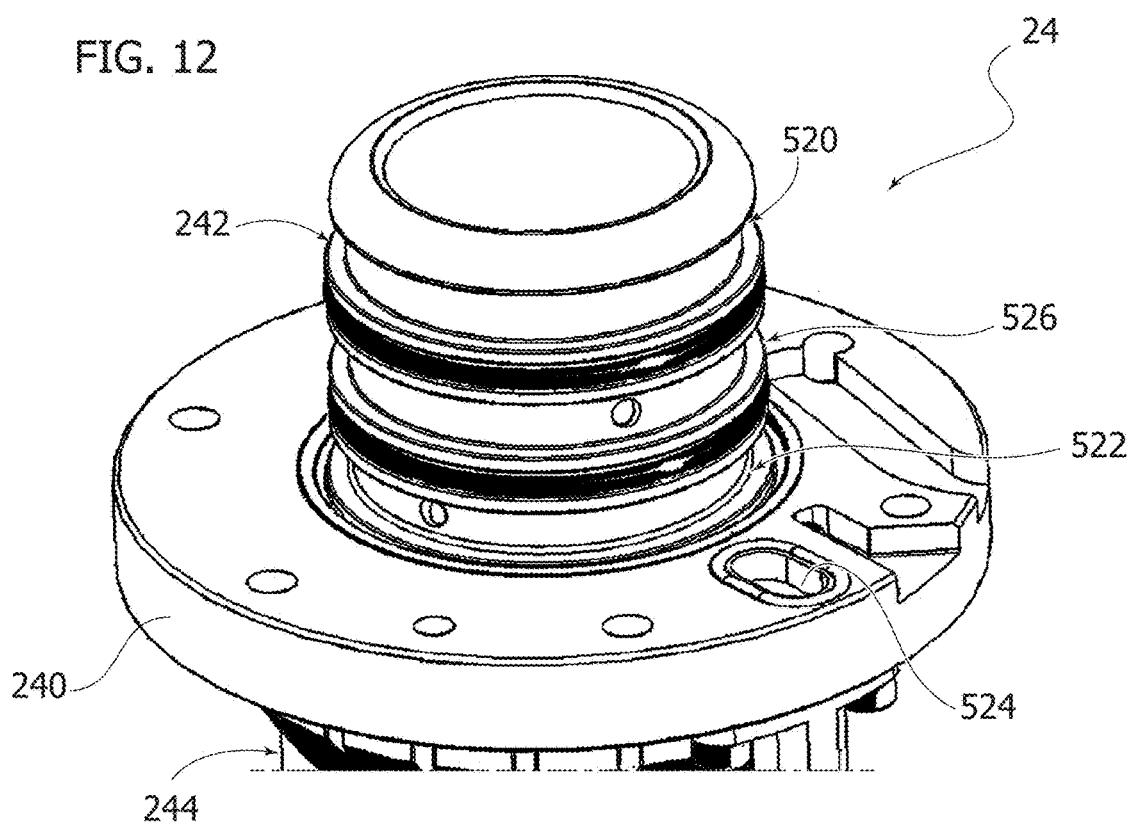
FIG. 12 is an enlarged perspective view of a portion of the laser head of FIG. 10.

As exemplified in FIG. 12, which shows the sensor cone 24 in perspective view, and in FIG. 14, which shows a partial sectional of the sensor cone 24 itself coupled to the duct 26, the sensor cone 24 has the cylindrical portion 242 that fits into the duct 26. The outer diameter of the cylindrical portion 242 is substantially the same as the inner diameter of the duct 28, but for a tolerance for enabling coupling via insertion. The cylindrical portion 242 has a plurality of annular grooves on its own outer wall, each ring lying in a plane perpendicular to the main axis of the cylindrical portion 242, the grooves being arranged on one another in such a way that, when the portion 242 is inserted into the duct 28, each groove identifies, together with the inner wall of the duct 28, an annular chamber around the portion 242.

Indicated in FIG. 12 are three chambers 520', 522', 524' that determine respective areas of distribution divided respectively, starting from the top, into an area 520' for the cutting assist gas, where the tubular duct 520 is coupled, an area 522' for the cooling air, where the tubular duct 522 is coupled, and area 524' for the cutting emulsion, where the tubular duct 524 is coupled. These areas, as exemplified in FIG. 12, are separated and isolated by gaskets, for example O-rings, on the non-grooved portions between one groove and the other, in order to ensure tightness in regard to fluids, in particular gases, so as to define chambers.

Figure 18:
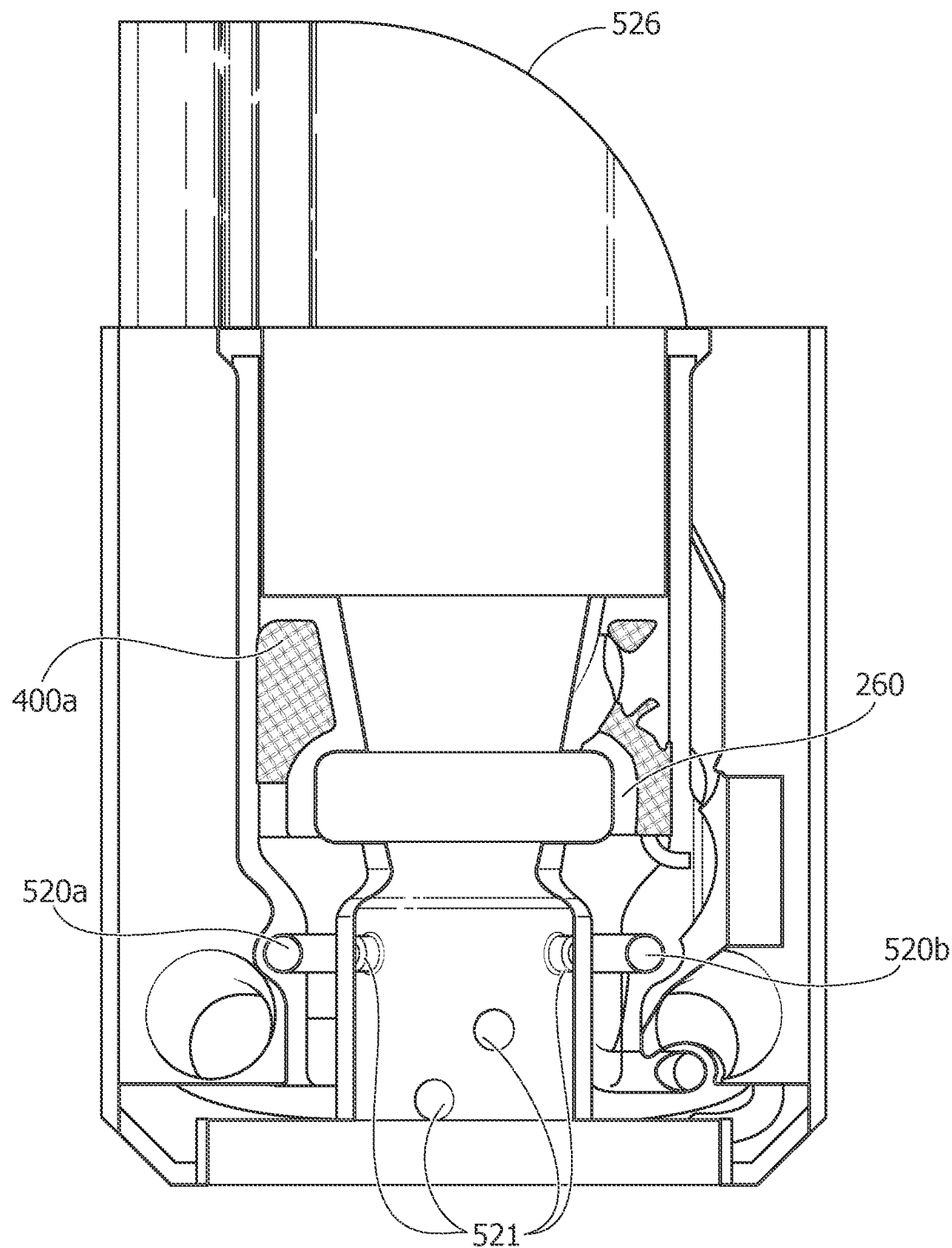
FIG. 18 is a cross-sectional view according to the line XVIII-XVIII of FIG. 15.

As exemplified in FIG. 18, the tubular ducts 520, 522, 524 give out into the above respective areas or chambers 520', 522', 524', which then comprise respective holes 521 on the wall of the portion 242 to enable entry into the sensor cone 24.

FIG. 12 likewise illustrates the chamber 523' that defines the distribution area the auxiliary fluid duct 523, which is configured to carry further assist gases, for example nitrogen for nitrogen piercing.

Obtaining one or more embodiments using additive technology facilitates positioning of all these supplies in a very limited area of the sensor cone 24, in a compact way.

The coupling thus obtained between the sensor cone 24 and the embodiment itself facilitates increase in the flow rate of the gas at high pressure. Moreover, there is obtained high flexibility of variation of the parameters available for the designer in provision of the coupling so as to control and vary the flow rate of gas at high/low pressure.

Figure 13:
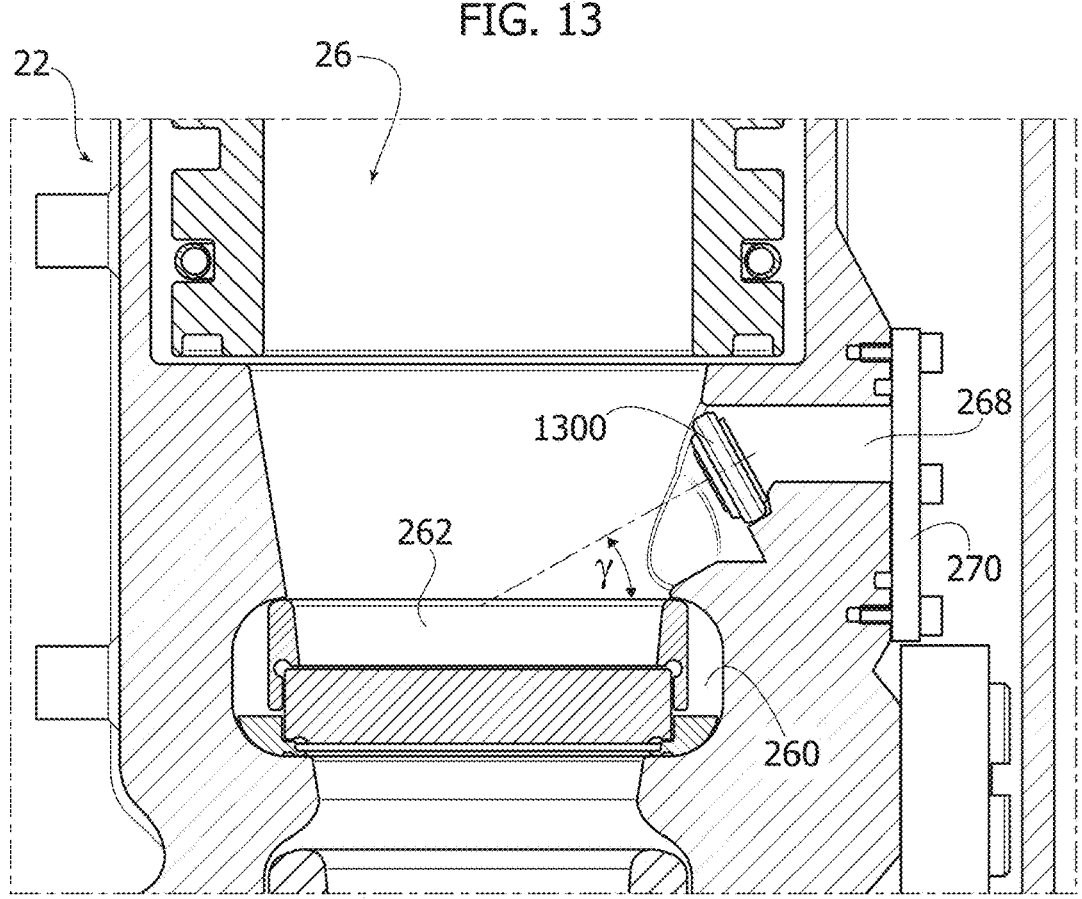
FIG. 13 is a cross-sectional view in a plane according to the line XIII-XIII of FIG. 10.

FIG. 13 exemplifies a cross-sectional view in a plane, which passes through the optical axis of the supporting body 22 of the laser head 20. As exemplified in FIG. 13, the supporting body 22 of the end effector 20 further comprises an opening prearranged so as to set the inside of the duct 26 in communication with the outside via an opening 268.

Such an opening may be prearranged for providing a housing for an optical sensor 1300, in particular a photodiode, in the first portion of the duct 26 upstream of the housing 260 for the protective glass 262.

For instance, the housing may be configured so that the sensor 1300 is set oriented, in particular, to form an angle γ that will facilitate monitoring of the light, which, following upon reflection by the top wall of the protective glass 262 during laser machining, reaches the sensor 1300. This angle γ may, for example, be approximately equal to 45°, measured between a horizontal plane of the glass and an optical axis of the sensor 1300 so as to detect a state of conservation of the protective glass 262, enabling replacement thereof in the most effective times and with the most effective modalities.

It should be noted that the opening 268 can be closed once the optical sensor 1300 has been inserted via a mobile hatch 270 purposely provided with connection means, for example hinged with screws to the supporting body 22.

Figure 15:
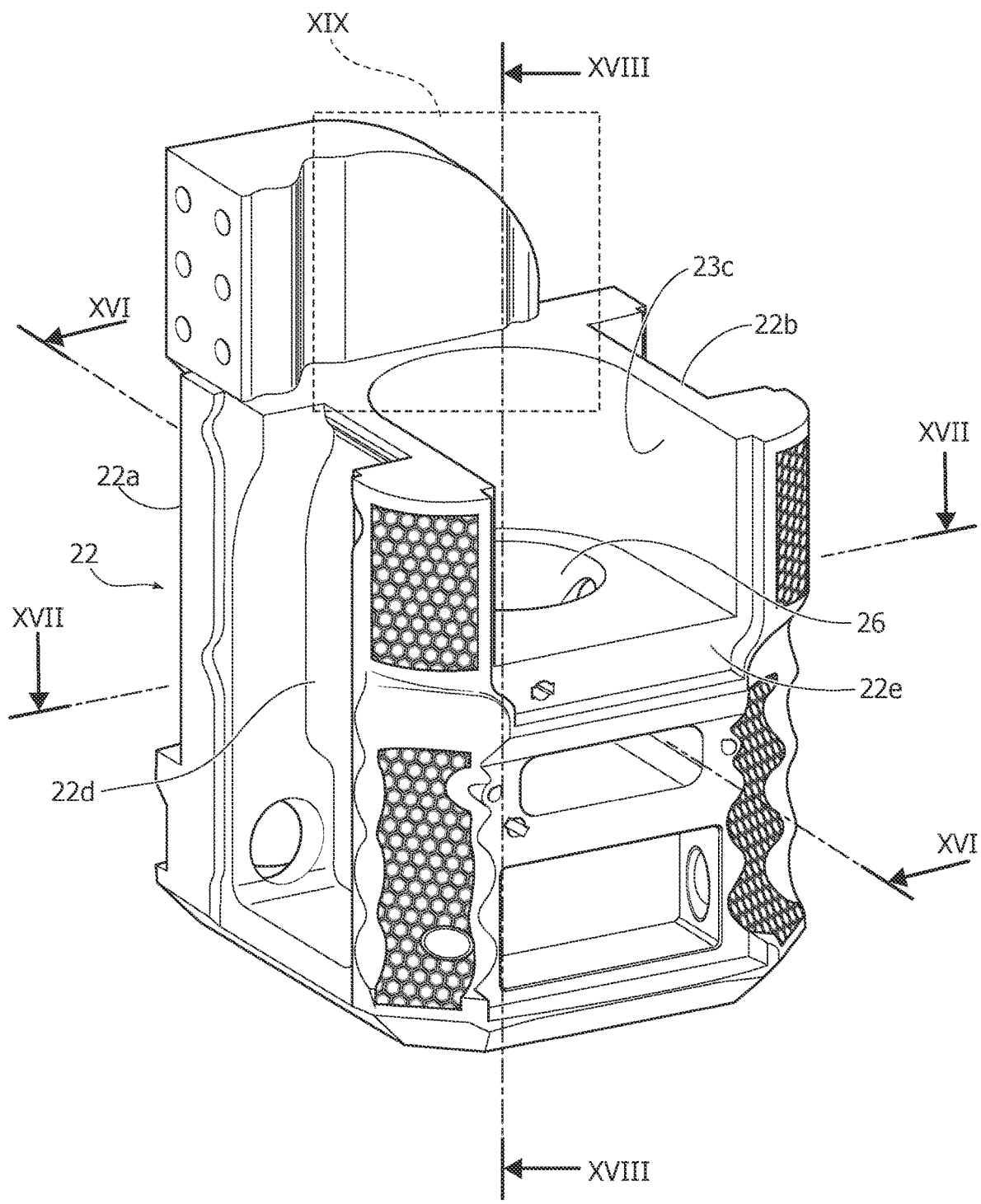
FIG. 15 is a perspective view of a supporting body according to one or more embodiments.

Illustrated in perspective view in FIG. 15 is the body 22, which is in general produced in a single piece only via additive manufacturing, which comprises in the body 22 both the heat exchanger 400 and the tubular ducts 520, 522, 523, 524. The body 22 has a substantially parallelepipedal shape and has a rear wall 22a, surmounted by the collector 526. Present between the side walls 22d of the body 22, provided in a roof wall 22b, is a U-shaped or C-shaped housing 22c, which is open towards the front wall 22e, and the rear wall of which, which is curved in the example illustrated, defines a gap with the rear wall 22a, in the bottom of which the duct 26 opens; the mouth of the latter is hence set at a lower level than the roof 22*b*, approximately half way up the body 22. This housing 22*c* receives the positioning tray 23, visible in FIG. 3.

From FIG. 16, which shows a perspective view of the body 22 sectioned along a vertical plane parallel to the axis OP, it may be noted that the tubular ducts 520, 522, 524 pass vertically along the rear wall 22*a*, in the proximity thereof. The heat exchanger 400, identified by the lattice structure visible in the cross-sectional view, comprises a tank portion 400*a*, in the gap between the rear wall 22*a* and the rear wall of the housing 22*c*, as well as a substantially circular tubular portion 400*b*, which extends from the tank 400*a* and surrounds the duct 26, substantially at the height of its median portion.

Figure 17:
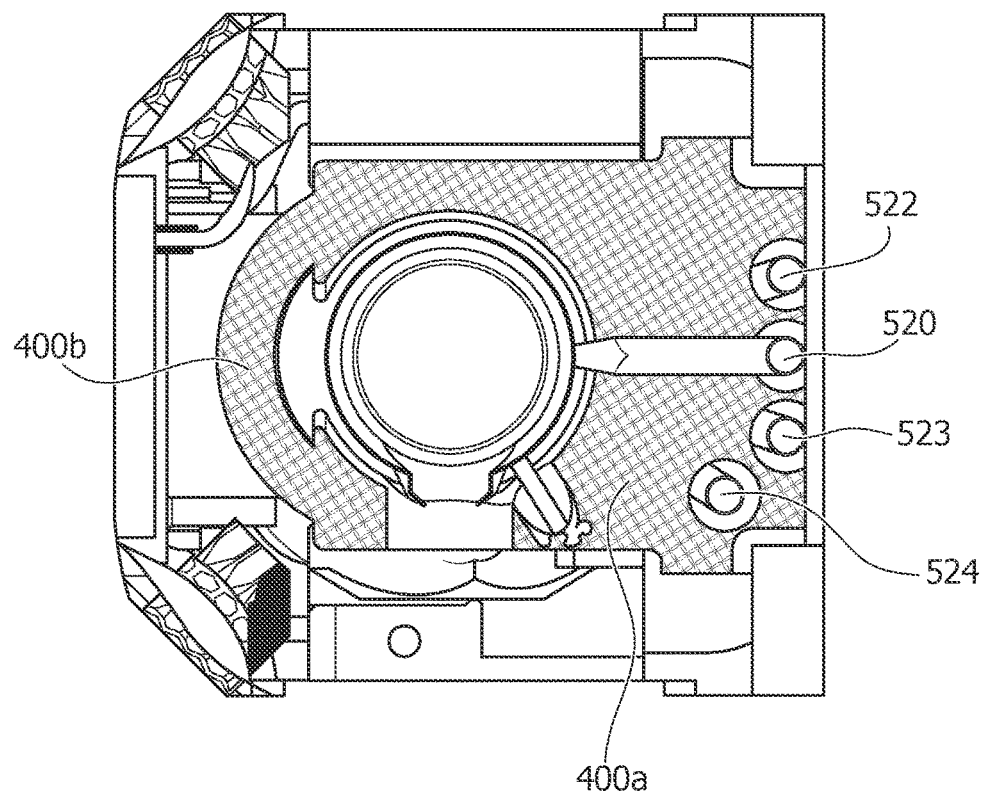
FIG. 17 is a cross-sectional view according to the line XVII-XVII of FIG. 15.

This is also visible in FIG. 17, which is a cross-sectional view according to a horizontal plane, which passes through the major diameter of the tubular portion 400*b*.

It may be noted that the cross-sectional view of FIG. 17 may correspond to the representation of a growth layer during additive manufacturing.

In FIG. 16 it may moreover be noted how the tank portion 400*b* extends throughout the length of the duct 26, even underneath the portion 260, i.e., in the portion in which the portion 242 is inserted, where the tubular ducts 520, 522, 524 that drop vertically curve to reach the substantially horizontal position, where the respective chambers 520', 522', 524' on the sensor cone 24 are located so as to give out, with their own outlet openings onto the aforesaid chambers 520', 522', 524'.

FIG. 18 is a front view of the body 22, which further highlights how the heat exchanger 400 surrounds the duct 26.

Figure 19:
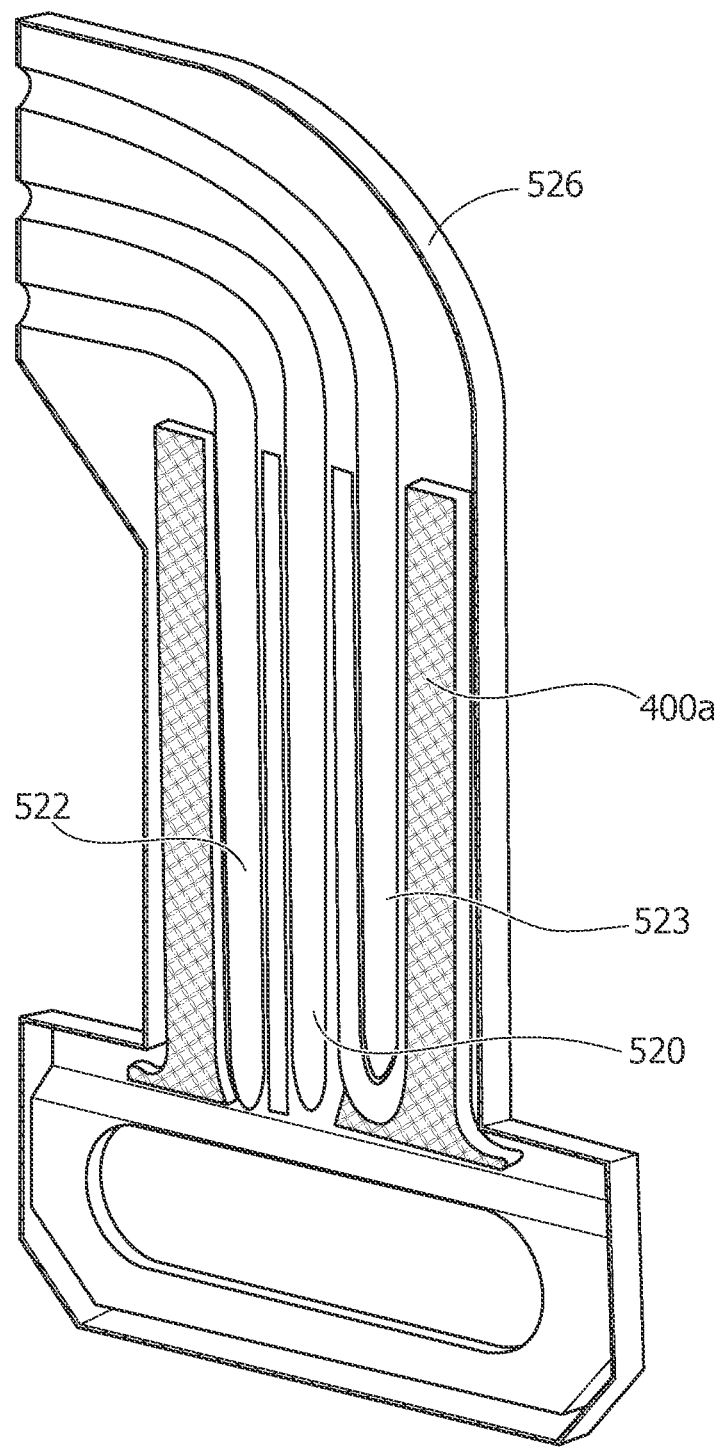
FIG. 19 is a cross-sectional view of a portion of FIG. 15 according to the arrow XIX.

FIG. 19 is a cross-sectional view in a vertical plane parallel to the rear wall 22*a*, in the proximity thereof, i.e., passing through the major diameter of the tubular ducts 520, 522, 524, which shows how the latter enter horizontally into the collector 526, which comprises corresponding connection inlets for the fluid lines, and then curve downwards and run vertically, inside the tank 400, as far as the height where the portion 242 of the cone 24 is located, once the portion 242 is inserted, and here, as shown in FIG. 16, they curve again to arrive horizontally at the portion 242. It is emphasised how advantageously, via additive manufacturing, it is possible to obtain both the heat exchanger, in particular the tank 400*a* and the aforesaid tubular ducts 520, 522, 524 that pass inside and curve, as illustrated, according to the requirements of coupling for distribution of the fluids used in the process.

Consequently, from what has just been highlighted above, the end effector, according to some embodiments, comprises a heat exchanger 400, which includes a tank portion 400*a*, which is prearranged partially or totally in a space comprised between the central duct 28 and walls of the body 22, in particular the gap between the rear wall 22*a* and at least the outer wall of the duct 28 facing it.

Moreover, the end effector, according to some embodiments, comprises at least one portion having a tubular shape 400*b* arranged around the central duct 28. In variant embodiments, there may even be a number of tubular portions around the duct 28.

Without prejudice to the underlying principles of the invention, the details and the embodiments may vary, even appreciably, with respect to what has been described, purely by way of example, without thereby departing from the sphere of protection, which is defined by the annexed claims.

It is pointed out how, according to one aspect of the description, the solution described may also be aimed at an end effector where said supporting body 22 of said end effector 20 between the set of ducts 520-524 and the heat exchanger 400 comprises, integrated in one and the same piece, for example via additive manufacturing, just the set of auxiliary fluid ducts 520, 522, 524, 523 configured to direct respective fluids used in laser machining onto said working surface 16 and configured to couple to said outlet portion 24, in particular wherein at least one auxiliary fluid duct 520 of said set of auxiliary fluid ducts 520, 522, 524, 523 comprises a plurality of branches 520*a*, 520*b*, 520*c*, 520*d*, which are configured to couple to said outlet portion 24 so as to supply a substantially uniform flow of fluid in said further duct 28 of said outlet portion 24.

Hence, in this way, the assist gas, for example oxygen, is evenly distributed in the chamber 520'. The configuration of the branches 520*a*, 520*b*, 520*c*, 520*d* can thus be provided in such a way as to facilitate uniform distribution of the laser-machining assist fluid within the duct 26, 28 for propagation of the laser beam, in particular in the portion of the duct 28 within the sensor cone 24, or else according to other configurations that may be necessary.

The above solution presents advantages in terms of encumbrance and weight, given that it integrates the channels in the body, which can be obtained, in particular using an additive-manufacturing process, with flexible geometries, in particular, of the branches, which may, at least virtually, be of any number and shape. The geometries may, for example in the tubular duct for distributing the laser-cutting assist gases, decelerate the gas and reduce the turbulence, thus facilitating fluid-dynamic coupling between the sensor cone and the embodiment itself.

It is pointed out how, according to a further aspect of the disclosure, the solution described may also be aimed at an end effector in which said supporting body 22 of said end effector 20 between the set of ducts 520-524 and the heat exchanger 400 comprises, integrated in one and the same piece, for example via additive manufacturing, just the heat exchanger 400 for cooling systems 40 located in said supporting body 22 so as to occupy a volume 400*a*, 400*b*, which surrounds at least one portion of said tubular duct 26 of said supporting body 22, wherein said heat exchanger 400 comprises an inlet chamber 224 and an outlet chamber 225 in communication with one another for passage of cooling fluid, and wherein said heat exchanger 400 has a lattice structure of thermally conductive elements 402 arranged so as to create a three-dimensional network configured to allow passage of a cooling fluid into said heat exchanger 400 between said inlet chamber 224 and said outlet chamber; in particular, said three-dimensional lattice structure of thermally conductive elements in said heat-exchanger tank 400 comprises a set of cells (for example, three-dimensional cells) of thermally conductive elements 402, said cells being substantially identical to one another, for example each cell having the structure of a skeleton of a polyhedron.

The above solution presents the advantage of using heat exchangers for carrying out cooling that lap as much of the surface as possible of a duct for guiding the laser radiation and make it possible to overcome the conventional limits of laser powers that can be used in laser machining operations, such as laser cutting.

Moreover, the above solution, as a result of the lattice structure and the fact that the cooling fluid laps the duct, enables an increase in the efficiency of heat exchange given the same total volume of the heat exchanger and enables a heat exchanger to be obtained having a lighter structure, given the same heat-exchange efficiency, as compared to known devices.

The aforesaid heat exchanger 400 or set of auxiliary ducts 520, 522, 523, 524 are likewise each formed in a single piece in the body 22 by means of additive-manufacturing technology of the powder-bed fusion type configured to fuse layers of metal material.

In general, the two aspects referred to above can hence be used individually or in combination. In combination, the solution described and claimed herein regards, in particular, an embodiment of end effector 20 for a machine tool 10 for laser machining processes configured to direct a laser beam L onto a working surface along an optical axis OP, said end effector 20 comprising a supporting body 22, which includes a duct 26 having an axis parallel to at least one portion of said optical axis OP of propagation of the laser beam L, said supporting body 22 being configured to couple said duct 26 to an outlet portion, in particular a sensor cone 24, which comprises a further duct 28 having an axis parallel to at least one portion of said optical axis OP of propagation of the laser beam L to provide an outlet for said laser beam L towards a working surface 16, wherein said supporting body 22 of said end effector 20 further comprises, formed in a single piece:
a set of auxiliary fluid ducts 520, 522, 524, 523 configured to direct respective fluids used in laser machining processes onto said working surface 16 and configured to couple to said outlet portion 24; and
a heat exchanger 400 for cooling systems 40 located in said supporting body 22 so as to occupy a volume 400a, 400b that surrounds at least one portion of said tubular duct 26 of said supporting body 22, wherein said heat exchanger 400 comprises an inlet chamber 224 and an outlet chamber 225 in communication with one another for passage of cooling fluid, and wherein said heat exchanger 400 has a lattice structure of thermally conductive elements 402 configured to allow passage of a cooling fluid into said heat exchanger 400 between said inlet chamber 224 and said outlet chamber.

The aforesaid single piece is in particular obtained by additive manufacturing.

The above solution, by integrating, in a single piece, ducts shaped, in particular, with a plurality of branches and a heat exchanger with lattice structure, advantageously as a whole enables an end effector to be obtained that enables effective cooling, without jeopardising the weight and hence the thermal inertia of the end effector, thus also making it possible to overcome the conventional limits of laser powers that can be used in laser machining operations, such as laser cutting.

Furthermore, production in a single piece of the central body of the end effector, in particular by additive manufacturing, enables reduction of the number of pieces and reduction of the number of machining operations, as well as management of just one schedule. In particular, with additive manufacturing it is not necessary to seal any possible contact surfaces (reduction of contamination is obtained). The reduction of contamination is an advantage for the performance of the end effector in so far as it brings about a reduction in failure rates.

Moreover, the solution may also be aimed at an end effector in which said duct 26 of said supporting body 22 has a tubular body with variable diameter, wherein:

a first, proximal, portion of the duct 26 has a first diameter W, a second, central, portion of said duct 26 has a second diameter Wm greater than said first diameter W and is configured to provide a housing 260 for a cylindrical glass body used as protective glass 262, where said second diameter Wm is substantially equal to a diameter of the cylindrical glass body used as protective glass 262, and a third, distal, portion of said duct 26 has a diameter equal to or smaller than the first diameter W;

and wherein the end effector further comprises an opening 268 prearranged so as to provide communication with an inside of said duct 26, which has an axis parallel to at least one portion of said optical axis OP of propagation of the laser beam L and is located in said supporting body, said opening being prearranged for providing a housing for an optical sensor in said first portion of the duct of said supporting body of the end effector, said housing being prearranged for housing an optical sensor, preferably a photodiode, oriented so as to detect a state of conservation of said protective glass.

The above solution facilitates installation of the optical sensor without the aid of further fixing supports in the head body in so far as the duct forms an integral part of the head body and can be customized for each sensor.

The invention claimed is:

1. An end effector for a machine tool for laser machining processes, said end effector being configured to direct a laser beam onto a working surface along an optical axis, said end effector comprising:

a supporting body, which comprises a duct having an axis parallel to at least one portion of said optical axis of propagation of the laser beam, and which has walls; said supporting body being configured to couple said duct to an outlet portion, a sensor cone, which comprises a further duct having an axis parallel to at least one portion of said optical axis of propagation of the laser beam to provide an outlet for said laser beam towards said working surface;

wherein said supporting body of said end effector further comprises:

a set of auxiliary fluid ducts configured to direct respective fluids used in laser machining processes onto said working surface and to couple to said outlet portion; and a heat exchanger for cooling, which is located in said supporting body so as to occupy a volume that surrounds at least one portion of said duct of said supporting body, comprising a tank portion set partially or totally in a space comprised between the duct and walls of said supporting body, wherein the set of auxiliary fluid ducts and the heat exchanger are formed in a single piece, wherein said heat exchanger located in said supporting body and said set of auxiliary fluid ducts are formed in the single piece by means of additive-manufacturing technology, of the powder-bed fusion type, configured to fuse layers of metal material, wherein said heat exchanger comprises an inlet chamber and an outlet chamber in communication with one another for passage of a cooling fluid, and wherein said heat exchanger has a lattice structure of thermally conductive elements configured to allow passage of a cooling fluid in said heat exchanger between said inlet chamber and said outlet chamber.

2. The end effector according to claim 1, wherein at least one auxiliary fluid duct of said set of auxiliary fluid ducts comprises a plurality of branches configured to couple to said outlet portion so as to provide a substantially uniform flow of fluids in said further duct of said outlet portion.

3. The end effector according to claim 1, wherein said end effector comprises, as metal material, at least one alloy of metals selected from the group consisting of aluminium, titanium, and nickel.

4. The end effector according to claim 1, wherein said lattice structure of said heat exchanger comprises thermally conductive elements arranged so as to create a three-dimensional network configured to allow passage of a cooling fluid in said heat exchanger between said inlet chamber and said outlet chamber.

5. The end effector according to claim 4, wherein said three-dimensional lattice structure of thermally conductive elements of said heat-exchanger tank portion comprises a set of three-dimensional cells of thermally conductive elements, said cells being substantially identical to one another.

6. The end effector according to claim 5, wherein each cell of said cells of thermally conductive elements has the structure of a skeleton of a rhombic or trapezo-rhombic dodecahedron.

7. The end effector according to claim 4, wherein said thermally conductive elements of said lattice structure of said heat-exchanger tank portion have a substantially cylindrical shape, with a diameter comprised between 0.5 mm and 1 mm.

8. The end effector according to claim 5, wherein said set of three-dimensional cells comprises a periodic spatial repetition of three-dimensional cells of thermally conductive elements that has a pitch of periodic spatial repetition, comprised between 4 mm and 10 mm.

9. The end effector according to claim 4, wherein said set of substantially identical cells comprises cells inclined by a certain angle with respect to the working surface, by an angle greater than 40°.

10. The end effector according to claim 1, wherein said volume comprises at least one portion having a tubular shape arranged around said duct.

11. The end effector according to claim 1, wherein also said outlet portion comprising the further duct is obtained by means of additive-manufacturing technology, of the powder-bed fusion type, configured to fuse layers of metal material.

12. The end effector according to claim 2, wherein said plurality of branches of said at least one auxiliary fluid duct comprises four branches configured to couple to said outlet portion at points evenly spaced apart along a circumference of said further duct of said outlet portion.

13. The end effector according to claim 1, wherein said set of auxiliary fluid ducts configured to direct fluids used in laser machining processes comprises at least one of the following:
a first auxiliary fluid duct configured to carry a laser-cutting assist gas;
a second auxiliary fluid duct, configured to carry an assist liquid for water-assist cutting;
a third auxiliary fluid duct, configured to carry further assist gases, for example nitrogen for nitrogen piercing; and
a fourth auxiliary fluid duct, configured to carry cooling air.

14. The end effector according to claim 1, wherein said duct of said supporting body has a tubular body having a variable diameter, wherein:
a first, proximal, portion of said duct has a first diameter;
a second, central, portion of said duct has a second diameter, greater than said first diameter, and is configured to provide a housing for a substantially cylindrical glass body used as protective glass, wherein said second diameter is equal to a diameter of the substantially cylindrical glass body used as protective glass, and
a third, distal, portion of said duct has a diameter equal to or smaller than the first diameter.

15. The end effector according to claim 14, further comprising an opening arranged so as to provide communication with an inside of said duct of said supporting body, said opening being arranged for providing a housing for an optical sensor in said first portion of the duct of said supporting body, said housing being arranged for housing the optical sensor, which is a photodiode, oriented so as to detect a state of conservation of said protective glass.

16. A machine tool for laser machining processes, for laser-cutting processes, said machine tool comprising:
at least one laser source configured to produce at least one laser beam;
an end effector according to claim 1;
a conveying structure coupled to said end effector and configured to translate and/or rotate the end effector; and
a processing module, which comprises at least one numeric control unit and is coupled to said conveying structure of said laser machine tool for driving the conveying structure to translate and/or rotate said end effector on a working surface in order to carry out at least one laser machining process.

17. A method for manufacturing an end effector for a machine tool for laser machining processes according to claim 1, the method comprising obtaining said set of auxiliary fluid ducts that are configured to direct respective fluids used in laser machining processes onto said working surface and said heat exchanger for cooling located in said supporting body of said end effector by means of additive-manufacturing technology, of the powder-bed fusion type, configured to fuse layers of metal material, wherein the set of auxiliary fluid ducts and the heat exchanger are formed in the single piece.

* * * * *